(12) United States Patent
Ingale et al.

(10) Patent No.: US 10,499,325 B2
(45) Date of Patent: *Dec. 3, 2019

(54) METHOD AND USER EQUIPMENT (UE) FOR PROVISIONING MINIMUM SYSTEM INFORMATION (MSI) IN WIRELESS COMMUNICATION SYSTEM

(71) Applicant: Samsung Electronics Co., Ltd., Suwon-si, Gyeonggi-do (KR)

(72) Inventors: Mangesh Abhimanyu Ingale, Yongin-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,594

(22) Filed: May 22, 2019

(65) Prior Publication Data
US 2019/0274095 A1    Sep. 5, 2019

Related U.S. Application Data

(63) Continuation of application No. 15/804,381, filed on Nov. 6, 2017, now Pat. No. 10,356,702.

(30) Foreign Application Priority Data

Nov. 4, 2016  (IN) .............................. 201641037672
Nov. 2, 2017  (IN) .............................. 2016 41037672

(51) Int. Cl.
H04W 48/10      (2009.01)
H04W 48/16      (2009.01)
(Continued)

(52) U.S. Cl.
CPC .......... *H04W 48/16* (2013.01); *H04W 48/02* (2013.01); *H04W 48/10* (2013.01); *H04W 48/12* (2013.01);
(Continued)

(58) Field of Classification Search
CPC ..... H04W 48/16; H04W 48/02; H04W 48/10; H04W 48/20; H04W 72/042
See application file for complete search history.

(56) References Cited

U.S. PATENT DOCUMENTS 9,538,455 B2    1/2017  Shi et al.
9,712,307 B2 *  7/2017  Lee ....................... H04W 28/06
(Continued)

FOREIGN PATENT DOCUMENTS

EP       2 603 045 A1     6/2013
WO    2008-093985 A1     8/2008
(Continued)

OTHER PUBLICATIONS

Extended European Search Report dated Sep. 17, 2019, issued in a counterpart European application No. 17867207.7-1214/3520492.
(Continued)

*Primary Examiner* — Said M Elnoubi
(74) *Attorney, Agent, or Firm* — Jefferson IP Law, LLP

(57) ABSTRACT

Accordingly the embodiments herein provide a method for provisioning Minimum System Information (MSI) for User Equipment (UE) in a wireless communication system. The method includes decoding Primary Broadcast Channel (PBCH) to acquire a first Master Information Block (MIB) periodically transmitted by base station. Further, the method includes determining to perform one of bar a cell from which the first MIB is acquired for a pre-determined period of time and acquire second MIB transmitted on Secondary Broadcast Channel (SBCH) by base station based on cell barring indication received in the first MIB. Furthermore, the method includes transmitting a request message to the base station to obtain at least one SI block of the OSI. In some embodiments, the method includes receiving a list of system configuration indexes (SCIs) and corresponding configura-
(Continued)

tion of SI blocks, from the base station based on SI storage capability of the UE indicated to the base station.

28 Claims, 13 Drawing Sheets

(51) Int. Cl.
*H04W 48/12* (2009.01)
*H04W 48/02* (2009.01)
*H04W 48/20* (2009.01)
*H04W 72/04* (2009.01)
*H04W 88/08* (2009.01)

(52) U.S. Cl.
CPC ......... *H04W 48/20* (2013.01); *H04W 72/042* (2013.01); *H04W 88/085* (2013.01); *Y02D 70/00* (2018.01); *Y02D 70/10* (2018.01); *Y02D 70/12* (2018.01); *Y02D 70/1226* (2018.01); *Y02D 70/1242* (2018.01); *Y02D 70/1262* (2018.01); *Y02D 70/142* (2018.01); *Y02D 70/21* (2018.01)

(56) References Cited

U.S. PATENT DOCUMENTS

| | | |
|---|---|---|
| 2010/0240376 A1 | 9/2010 | Dominguez Romero et al. |
| 2013/0143548 A1 | 6/2013 | Rayavarapu et al. |
| 2015/0057002 A1 | 2/2015 | Lee et al. |
| 2015/0230249 A1* | 8/2015 | Nguyen .................. H04W 4/70 370/329 |
| 2016/0119893 A1 | 4/2016 | Chen |
| 2016/0212737 A1* | 7/2016 | Jang ........................ H04L 69/22 |
| 2016/0219493 A1 | 7/2016 | Kim et al. |
| 2016/0330677 A1* | 11/2016 | Wu ........................ H04W 48/02 |
| 2016/0345325 A1* | 11/2016 | Liu ...................... H04W 74/006 |

FOREIGN PATENT DOCUMENTS

| | | |
|---|---|---|
| WO | 2016/003140 A1 | 1/2016 |
| WO | 2017-105317 A1 | 6/2017 |
| WO | 2018-016922 A1 | 1/2018 |
| WO | 2019-068257 A1 | 4/2019 |

OTHER PUBLICATIONS

Huawei et al: "Discussion on immediate cell reselection issue", 3GPP Draft; R2-1812431 Discussion on Immediate Cell Reselection Issue, 3rd Generation Partnership Project (3GPP), Mobile Competence Centre; vol. RAN WG2, No. XP051522028; Aug. 10, 2018; Gothenburg, Sweden.

Tdia et al: Addition of new test case: NB-IoT/Cell selection/ Qrxlevmin and Qqualmin/Serving cell becomes non-suitable; 3GPP Draft; (REL-13)_R5-166226, 3rd Generation Partnership Project (3GPP), Mobile Competence Centre; vol. RAN WG5, No. XP051661094; Sep. 16, 2016; Gothenburg, Sweden.

Samsung: "System Information Signalling in NR", 3GPP Draft; R2-162215 System Information Signaling in NR, 3rd Generation Partnership Project (3GPP), Mobile Competence Centre; vol. RAN WG2, No. XP051081924; Mar. 31, 2016; Dubrovnik, Croatia.

* cited by examiner

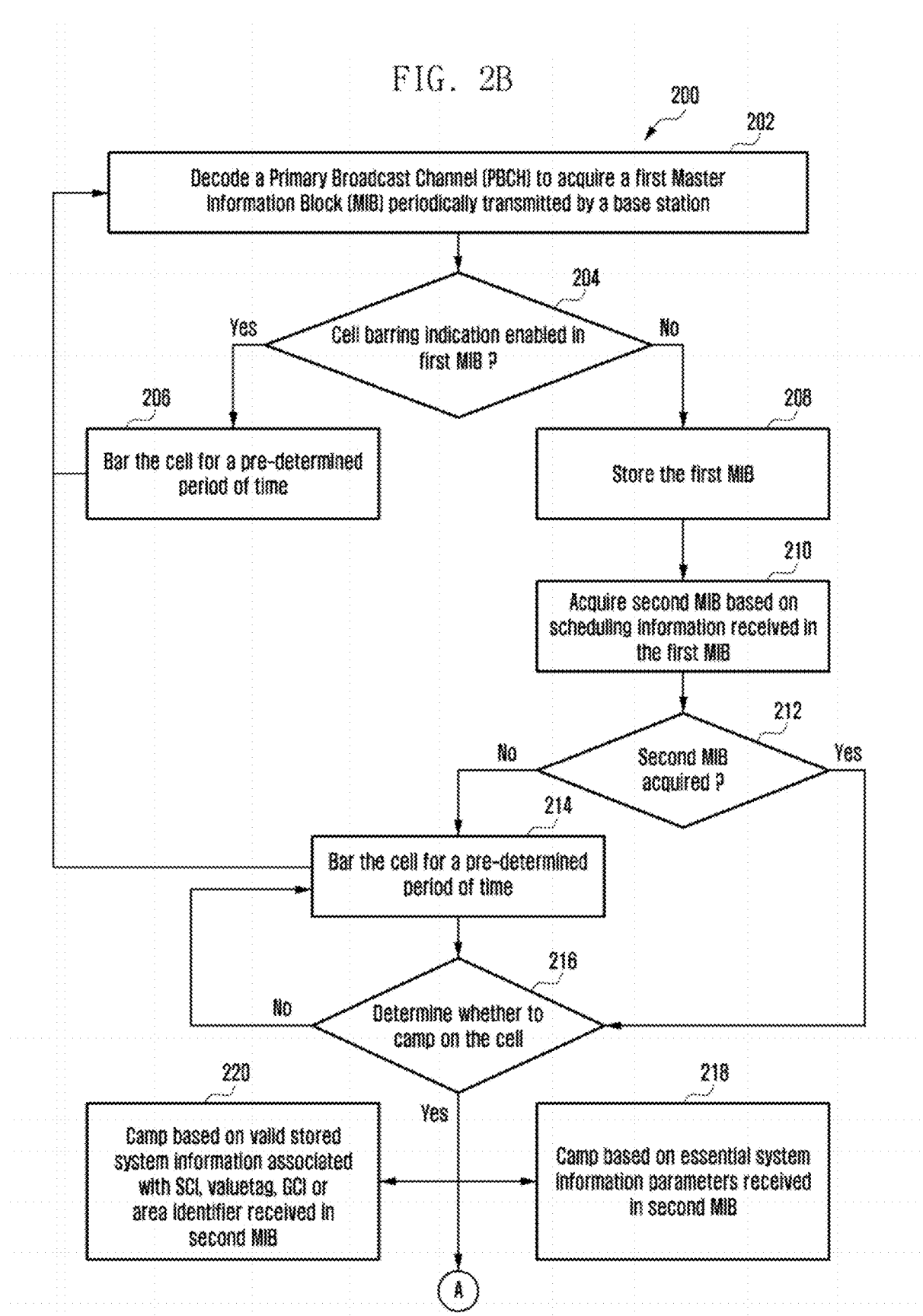

METHOD AND USER EQUIPMENT (UE) FOR PROVISIONING MINIMUM SYSTEM INFORMATION (MSI) IN WIRELESS COMMUNICATION SYSTEM

CROSS-REFERENCE TO RELATED APPLICATION(S)

This application is a continuation application of prior application Ser. No. 15/804,381, filed on Nov. 6, 2017, which claimed the benefit under 35 U.S.C. § 119(a) of an Indian Provisional patent application filed on Nov. 4, 2016, in the Indian Patent Office and assigned Serial number 201641037672, and of an Indian Complete patent application filed on Nov. 2, 2017, in the Indian Patent Office and assigned Serial number 201641037672, the entire disclosure of each of which is hereby incorporated by reference.

BACKGROUND

The present disclosure relates to a pre-5th-Generation (5G) or 5G communication system being developed to meet the growing demand for high speed data services, support ultra-reliability and low latency applications and support massive machine type communication beyond 4th-Generation (4G) communication system such as Long Term Evolution (LTE).

In order to meet the demand of exponentially increasing data traffic and new services, efforts are being made to develop an improved 5G or pre-5G communication system. Therefore, the 5G or pre-5G communication system is also called a 'Beyond 4G Network' or a 'Post LTE System' or 'Next generation of International Mobile Telecommunication (IMT)-Advanced' or IMT-2020 system.

The 5G communication system is expected to operate not only in lower frequency bands e.g. 700 MHz to 6 GHz but also operate in higher frequency (mmWave) bands, e.g. 10 GHz to 100 GHz bands, so as to accomplish higher data rates. In order to mitigate propagation loss of the radio waves and increase the transmission distance, the beam-forming, massive Multiple-Input Multiple-Output (MIMO), Full Dimensional MIMO (FD-MIMO), array antenna, an analog beam forming, large scale antenna techniques are discussed in the 5G communication system.

In addition, in 5G communication systems, development for system network improvement is under way based on advanced small cells, cloud Radio Access Networks (RANs), ultra-dense networks, Device-to-Device (D2D) communication, wireless backhaul, moving network based on mobile relay, cooperative communication, Coordinated Multi-Points (CoMP), reception-end interference cancellation and the like.

In the 5G communication system, Hybrid FSK and QAM Modulation (FQAM) and Sliding Window Superposition Coding (SWSC) as an Advanced Coding Modulation (ACM), and Filter Bank Multi Carrier (FBMC), Non-Orthogonal Multiple Access (NOMA), and Sparse Code Multiple Access (SCMA) as an advanced access technology have been developed.

In addition, the next generation wireless system is expected to address different use cases having quite different requirements in terms of data rate, latency, reliability, mobility etc. However, it is expected that the design of the air-interface of the next generation would be flexible enough to serve the UEs having quite different capabilities depending on the use case and market segment the UE cater service to the end customer. Few example use cases the next generation wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for an autonomous vehicle.

Further, a physical layer of wireless cellular system in both Downlink (DL) and Uplink (UL) operating in mmWave/cmWave would be based on new air-interface different from that of IMT-Advanced air-interface to meet the challenging requirements and providing enhanced mobile broadband user experience. Next generation IMT-Advanced wireless cellular system is expected to deliver several 100 Mbps to a few tens of Gbps user experienced data rates in comparison to wireless systems based on IMT-Advanced. These very high data rates need to be available ubiquitously across the coverage area.

Further, apart from user experienced data rates next generation of wireless cellular system is expected to deliver on other requirements like peak data rate (few 10 of Gbps), reduced latency (down to 1 ms), better spectral efficiency compared to IMT-Advanced system and many other requirements. The next generation of wireless cellular system is foreseen to be deployed in higher frequency bands above 6 GHz (e.g. 10 GHz 100 GHz, also called mmWave and/or cmWave) due to availability of large amount of spectrum bandwidths. In the initial phase of deployment next generation of wireless cellular system is expected to be deployed in lower frequency bands below 6 GHz using spectrum farming techniques.

Further, one of the requirements for next generation RAT is energy efficiency; so the design of system information provisioning needs to address the energy efficiency requirement to minimize always ON periodic broadcast. Another aspect related to broadcasting of system information is high signaling overhead in the context of NR operation in higher frequency bands (above 6 GHz) where DL beam sweeping operation is inevitable to reach the coverage area of the cell. Broadcasting all the system information on the coverage beams which are subject to DL beam sweeping may lead to excessive signaling overhead. Therefore, another design criterion for system information provisioning needs to address the signaling overhead aspect.

Another aspect related to broadcasting of system information using DL beam sweeping is restrictive and inflexible scheduling. The transmission resources remaining after resources consumed by system information may be only used for data scheduling for a user in the direction of the DL coverage beam. Therefore, if more time/frequency resources are consumed by system information then user data scheduling becomes restrictive and inflexible. For the sake of illustration of disclosed methods for acquisition of system information by a User Equipment (UE) on demand it is assumed the air-interface of next generation wireless cellular system would be based on Orthogonal Frequency Division Multiple-access (OFDMA) Radio Access Technology (RAT) in DL and UL. However the numerology (i.e. OFDM symbol duration, carrier spacing etc) of next generation RAT can be different from the OFDMA numerology of IMT-Advanced system.

The above information is presented as background information only to help the reader to understand the present invention. Applicants have made no determination and make no assertion as to whether any of the above might be applicable as prior art with regard to the present application.

OBJECT OF INVENTION

The principal object of the embodiments herein is to provide a method and a User Equipment (UE) for provisioning Minimum System Information (MSI) in a wireless communication system.

Another object of the embodiments herein is to decode a Primary Broadcast Channel (PBCH) to acquire a first Master Information Block (MIB) periodically transmitted by a base station.

Another object of the embodiments herein is to determine to perform one of: bar a cell from which the first MIB is acquired for a pre-determined period of time and acquire a second MIB transmitted on a Secondary Broadcast Channel (SBCH) by a base station based on a cell barring indication received in the first MIB.

Another object of the embodiments herein is to bar a cell from which the first MIB is acquired for a pre-determined period of time when the received cell barring indication is enabled.

Another object of the embodiments herein is to consider the cell from which the second MIB is acquired as a candidate cell for camping or to bar the cell for a pre-determined period of time, wherein the cell is barred for a pre-determined period of time when the second MIB is not acquired.

Another object of the embodiments herein is to apply at least one cell selection parameter to camp on a cell from which the first MIB and second MIB are acquired, wherein the cell selection parameter is either used from the received information in the acquired second MIB or from the valid stored essential system information corresponding to at least one of: acquired system configuration index (SCI), acquired valuetag, acquired global cell identity (GCI) and acquired area identity.

Another object of the embodiments herein is to transmit a request message to the base station to obtain at least one SI block of the OSI, where the request message is transmitted based on reservation of one of: at least one physical random access channel (PRACH) preamble and a plurality of PRACH resources.

Another object of the embodiments herein is to transmit SI storage capability information in response to receiving a SI storage UE capability request message from the base station in a connected mode. The UE receives a list of system configuration indexes (SCIs) and corresponding configuration of SI blocks, from the base station based on the SI storage capability of the UE.

Another object of the embodiments herein is to store the list of SCIs and corresponding configuration of SI blocks by the UE.

SUMMARY

Accordingly the embodiments herein provide a method for provisioning Minimum System Information (MSI) for a User Equipment (UE) in a wireless communication system. The method includes decoding a Primary Broadcast Channel (PBCH) to acquire a first Master Information Block (MIB) periodically transmitted by a base station. Further, the method includes determining to perform one of: bar a cell from which the first MIB is acquired for a pre-determined period of time and acquire a second MIB transmitted on a Secondary Broadcast Channel (SBCH) by a base station based on a cell barring indication received in the first MIB.

In an embodiment, the acquired first MIB is stored when the received cell barring indication is disabled and wherein the second MIB is acquired based on scheduling information received in the first MIB.

In an embodiment, the cell from which the first MIB is acquired is barred for a pre-determined period of time when the received cell barring indication is enabled.

In an embodiment, the method comprises determining to perform one of: consider the cell from which the second MIB is acquired as a candidate cell for camping and bar the cell for a pre-determined period of time.

In an embodiment, the cell is barred for a pre-determined period of time when the second MIB is not acquired.

In an embodiment, the cell is considered as the candidate cell for camping based on at least one of: essential system information parameters for cell selection and cell access received in the acquired second MIB; and when the essential system information parameters are not received in the acquired second MIB and the UE has valid stored essential system information parameters for cell selection and cell access corresponding to at least one of: the system configuration index (SCI), the valuetag, the global cell identity (GCI) and area identifier associated with the second MIB received in the acquired second MIB, wherein the UE has obtained the stored essential system information parameters from another cell or another frequency.

In an embodiment, the acquired second MIB is referred as System Information Block Type 1 (SIB1), the Secondary Broadcast Channel (SBCH) is a physical downlink shared channel (PDSCH) scheduled by a physical downlink control channel (PDCCH) and the Primary Broadcast Channel (PBCH) is a non-scheduled downlink broadcast channel.

In an embodiment, the method includes applying at least one cell selection parameter to camp on a cell from which the first MIB and second MIB are acquired, wherein the cell selection parameter is either used from the received information in the acquired second MIB or valid stored essential system information corresponding to at least one of: acquired SCI, acquired valuetag, acquired global cell identity (GCI) and acquired area identifier.

In an embodiment, the method includes storing the acquired second MIB and at least one of the SCI, the valuetag, the GCI and the area identifier associated with the acquired second MIB. The method includes accessing the camped cell based on at least one of: random access parameter indicated in the acquired second MIB and valid stored essential system information corresponding to at least one of: acquired SCI, acquired valuetag, acquired GCI and acquired area identifier. The method includes determining whether at least one of a SI block of Other System Information (OSI) available in the camped cell is provided based an on-demand basis, wherein the on-demand basis to deliver the SI block of the OSI available in the camped cell is decided based on at least one of an indication and a flag received in the acquired second MIB. Further, the method includes transmitting a request message to the base station to obtain at least one SI block of the OSI.

In an embodiment, transmitting the request message to the base station to obtain at least one SI block of the OSI comprises determining reservation of one of: at least one physical random access channel (PRACH) preamble and a plurality of PRACH resources, wherein the reservation of PRACH preambles and PRACH resources is indicated in the acquired second MIB.

In an embodiment, the request message transmitted to the base station is a SI request message to obtain at least one SI block of the OSI, in response to determining that at least one PRACH preamble is not reserved and plurality of PRACH resources are not reserved as indicated in the acquired second MIB.

In an embodiment, the SI request message is transmitted in response to a Random Access Response message received from the base station for a PRACH preamble transmission, wherein the transmitted PRACH preamble is an unreserved preamble selected randomly from a plurality of PRACH preambles.

In an embodiment, the request message transmitted to the base station is a PRACH SI preamble to obtain at least one SI block of the OSI, in response to determining that at least one PRACH preamble is reserved as indicated in the acquired second MIB.

In an embodiment, the request message transmitted to the base station is a PRACH SI preamble to obtain at least one SI block of the OSI, in response to determining that plurality of PRACH resources are reserved as indicated in the acquired second MIB; wherein the reserved PRACH resource is a time-frequency resource.

In an embodiment, the PRACH SI preamble is transmitted on the reserved time-frequency PRACH resource reserved for obtaining at one SI block of the OSI, wherein the transmitted PRACH SI preamble is an unreserved preamble selected randomly from a plurality of PRACH preambles.

In an embodiment, the method further includes receiving a SI storage UE capability request message from the base station in a connected mode. The method includes transmitting SI storage capability information by the UE. The method includes receiving a list of system configuration indexes (SCIs) and corresponding configuration of SI blocks, from the base station based on the SI storage capability of the UE indicated to the base station.

In an embodiment, the received list of SCIs and corresponding configuration of SI blocks are stored by the UE, wherein the UE discards SCIs and corresponding configuration of SI blocks acquired from different cells other than the camped cell, based on expiry of a validity timer associated with stored SI blocks.

In an embodiment, the storage of plurality of configuration corresponding to one or more SI-block(s) is prioritized for the associated SCI(s) changing frequently compared to plurality of configuration corresponding to one or more SI-block(s) for the associated SCI(s) rarely received in acquired MSI.

Accordingly the embodiments herein provide a user equipment (UE) provisioned to acquire Minimum system information (MSI) in a wireless communication system. The UE is configured to decode a Primary Broadcast Channel (PBCH) to acquire a first Master Information Block (MIB) periodically transmitted by a base station. Further, the UE is configured to determine to perform one of: bar a cell from which the first MIB is acquired for a pre-determined period of time or acquire a second MIB transmitted on a Secondary Broadcast Channel (SBCH) by a base station based on a cell barring indication received in the first MIB.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 2B and 2C are flow charts illustrating a method for provisioning Minimum System Information (MSI) for a User Equipment (UE) in a wireless communication system, according to an embodiment as disclosed herein;

DETAILED DESCRIPTION

Figure 1:
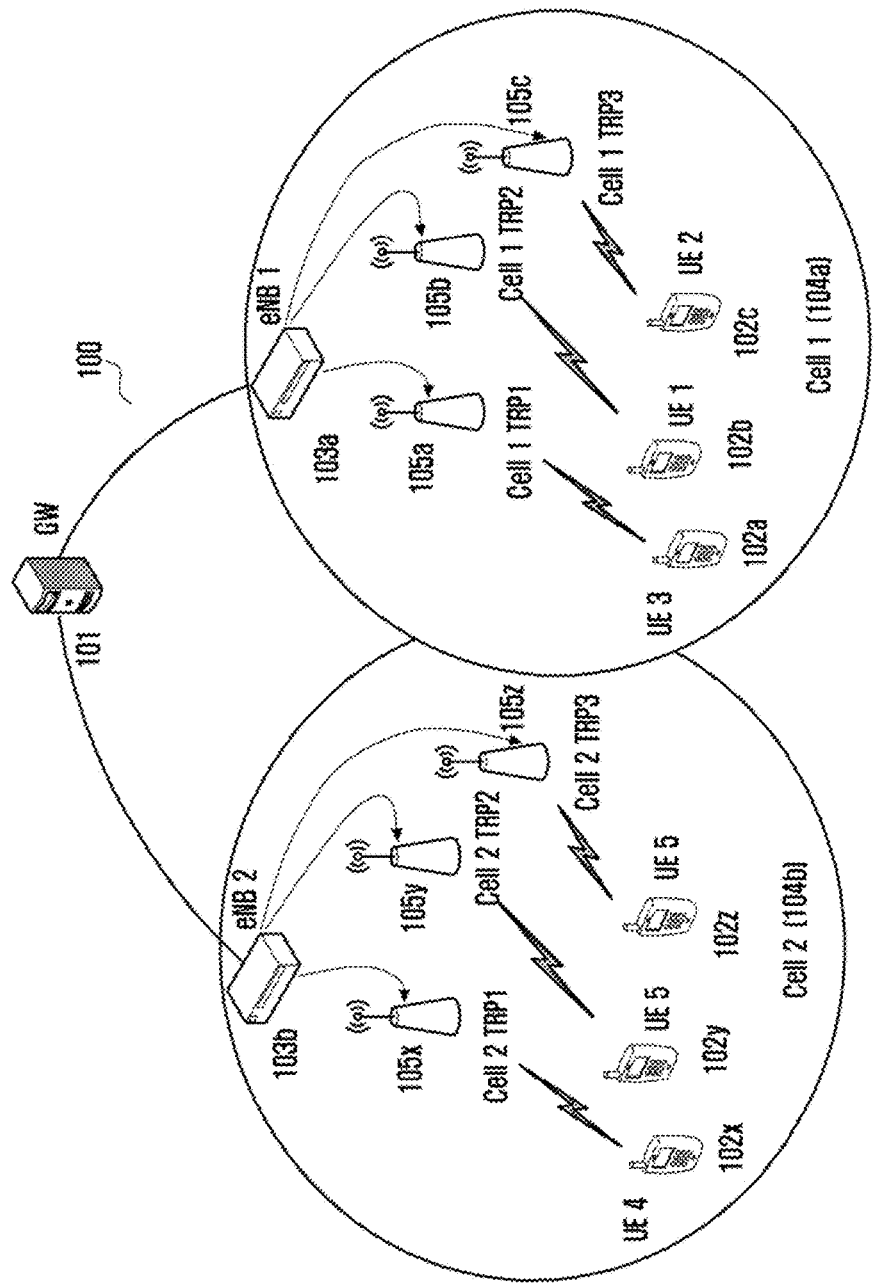
FIG. 1 is an example illustration of Radio Access Network (RAN) deployment of next generation wireless system, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

Throughout the description, the terms base station, eNode-B (eNB), gNode-B (gNB), Radio Access Network (RAN) and network (NW) are used interchangeably. Throughout the description, the terms UE and mobile station are used interchangeably. Throughout the description, the terms changed SI, updated SI, and modified SI are used interchangeably.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiments herein provide a method for provisioning Minimum System Information (MSI) for a User Equipment (UE) in a wireless communication system. The method includes decoding a Primary Broadcast Channel (PBCH) to acquire a first Master Information Block (MIB) periodically transmitted by a base station. Further, the method includes determining to perform one of: bar a cell from which the first MIB is acquired for a pre-determined period of time and acquire a second MIB transmitted on a Secondary Broadcast Channel (SBCH) by a base station based on a cell barring indication received in the first MIB.

In an embodiment, the acquired first MIB is stored when the received cell barring indication is disabled and the second MIB is acquired based on scheduling information received in the first MIB. In some embodiments, the cell from which the first MIB is acquired is barred for the pre-determined period of time when the received cell barring indication is enabled.

In various embodiments, the method includes determining to perform one of: consider the cell from which the second MIB is acquired as a candidate cell for camping and bar the cell for a pre-determined period of time.

In an embodiment, the cell is barred for a pre-determined period of time when the second MIB transmitted is not acquired.

In an embodiment, the cell is considered as the candidate cell for camping based on at least one of: essential system information parameters for cell selection and cell access received in the acquired second MIB.

In an embodiment, when the essential system information parameters are not received in the acquired second MIB, and the UE has valid stored essential system information parameters for cell selection and cell access corresponding to at least one of: the system configuration index (SCI), the valuetag, the global cell identity (GCI) and area identifier associated with the second MIB received in the acquired second MIB, wherein the UE has obtained the stored essential system information parameters from another cell or another frequency.

In an embodiment, the System Configuration Index or System Configuration Identifier is an index/identifier which is associated with a set of system information parameters and corresponding parameter values of a SI-block which is provided by the network either on periodic broadcast or on UE request.

In an embodiment, the plurality of SCI and minimum system information is transmitted in at least one system information block called the master information block (MIB).

In an embodiment, the minimum system information comprises one or more of: system frame number (SFN), PLMN-Id, parameters to support cell selection i.e. camping parameters, barring information to access the camped cell i.e. related to cell access, cell barring indication, indicator(s) whether other SI-block(s) periodically broadcasted or provided on demand i.e. UE request, configuration for requesting other SI-block(s) if on demand mechanism is allowed (e.g. RACH like), SCI for each of the other SI-block(s) regardless of periodic broadcast or provided on demand, scheduling information for broadcasted SI-block(s) i.e. related to SI-block(s) periodically broadcasted, bitmap indicating which SI-block(s) are supported by the cell.

In an embodiment, one or more Master Information Block (MIB) of different size is defined and UE identifies the size of MIB based on detection of synchronization signal; wherein different synchronization signals are used for different MIB size.

In an embodiment, one or more MIB of different size is defined and UE identifies the size of MIB based on detection of synchronization signal; wherein one of the primary synchronization signal or the secondary synchronization signal is different for different MIB size.

In another embodiment, the MIB size is dependent on the frequency of operation; wherein the MIB size is pre-defined for different operating frequency or operating frequency range.

In yet another embodiment, the MIB size is determined based on blind decoding of the block comprising minimum SI and performing the CRC check on the decoded block by the UE.

In another embodiment, there can be multiple MIB(s) defined wherein the size of the first MIB is fixed and the size of the second MIB is indicated in the first MIB or determined based on one of the primary or secondary synchronization signal or blindly decoded by the UE.

In an embodiment, there can be multiple MIB(s) defined wherein the periodicity of the first MIB is fixed and the periodicity of the second MIB is indicated in the first MIB.

In an embodiment, the UE determines whether it is allowed to request one or more other SI-block(s) from network based on one or more of: the on demand indicator in minimum system information, the bitmap concerning supported SI-block(s) in the cell and the scheduling information related to SI-block(s) transmitted in the MSI.

In an embodiment, each bit in the bitmap concerning supported SI-block(s) in the cell indicates whether the corresponding SI-block or SI part/SI message is supported by the cell or not.

In an embodiment, the UE determines whether it is allowed to request one or more other SI-block(s) from network based on the bitmap concerning supported SI-block(s) in the cell and the absence of scheduling information related to SI-block(s) indicated as supported by the bitmap.

In an embodiment, the UE determines that it is allowed to request one or more other SI-block(s) from network based on the bitmap concerning supported SI-block(s) in the cell and the presence of on demand indicator for those SI-block(s) indicated as supported by the bitmap.

In an embodiment, the UE determines that it is allowed to request one or more other SI-block(s) from network based on the presence of on demand indicator and absence of scheduling information related to SI-block(s) determined from scheduling information transmitted in the MSI.

In an embodiment, the UE determines whether it is allowed to request one or more essential SI-block(s) from network based on absence of scheduling information related to SI-block(s) in minimum SI; wherein the essential SI-block(s) are mandatory SI-block(s) like LTE SIB1, SIB2 etc.

In an embodiment, the UE determines that it is allowed to request one or more essential SI-block(s) from network based on the presence of on demand indicator for one or more essential SI-block(s) in minimum SI; wherein the essential SI-block(s) are mandatory SI-block(s) like LTE SIB1, SIB2 etc.

In an embodiment, multiple SCI are broadcasted in minimum system information wherein each SCI is associated with SI-block (or SI part or SI message) provided in other system information either through periodic broadcast or by UE request i.e. on demand.

In an embodiment, a SI-block or SI message concern a set of parameters that are functionality related and hence some similar scheduling requirements.

In an embodiment, a SI part or SI message concerns either a one-to-one mapping between SI part/SI message and SI-block or multiple SI-block(s) are bundled as one SI part/SI message; wherein the mapping between SI part/SI message and SI-block is either fixed or configurable.

In an embodiment, if the mapping between SI part/SI message and SI-block is configurable then such configuration information related to mapping is provided in minimum SI.

In an embodiment, the scheduling information related to SI-block(s) supported in the cell comprises the mapping between SI part/SI message and one or more SI-block(s), periodicity of the SI message, SI message broadcast window and an indicator whether the SI message is provided on demand or periodically broadcasted; wherein the periodicity of the SI message is with reference to start of system modification period.

In an embodiment, a SCI can be associated with SI-block comprising minimum SI parameters which cannot be included in first MIB and some important cell-specific parameters like cell selection parameters, cell access parameters and cell re-selection parameters; wherein such a SI-block can be termed as comprising essential system information.

In an embodiment, at least two preambles are reserved for SCI associated with SI-block comprising minimum SI parameters which cannot be included in MSI and some important cell-specific parameters; wherein one preamble indicates transmission of UL grant in random access response (RAR) along with SI parameters and another preamble indicates transmission of only SI parameters in RAR without UL grant.

In an embodiment, the on demand indicator that indicates UE is allowed to request one or more other SI-block(s) from network and the bitmap concerning supported SI-block(s) in the cell is transmitted in RAR.

In an embodiment, when the UE requests one or more other SI-block(s) on demand from the network the scheduling information of the requested SI-block(s); if decided to be broadcasted by the network; can be included in one of the RAR, Message 4 (MSG4), SI Response message or can be already included in minimum SI or essential SI; wherein the scheduling information comprises the mapping between SI part/SI message and one or more SI-block(s), periodicity of the SI message and SI message broadcast window.

In an embodiment, the base station provides UE with one or more configuration for each SI-block or SI part/SI message wherein each configuration of the SI-block or SI part/SI message is associated with a System configuration index or system configuration identifier (SCI).

In an embodiment, UE is provided with a configuration list corresponding to each SI-block or SI part requested by the UE wherein, transmission of a single configuration or plurality of configuration corresponding to the requested SI-block or SI part is network decision based on UE storage capability.

In an embodiment, UE capability to store plurality of configurations corresponding to SI-block requested is informed to the network; wherein the capability can be indicated during the request procedure or after the request procedure.

In an embodiment, when the base station provides one or more configuration for each SI-block or SI part/SI message then UE which does not have the capability to store multiple configurations corresponding to the SI-block identifies the configuration applicable in the serving cell based on the SCI broadcasted in minimum SI and stores the relevant configuration while discarding other configurations not applicable in the serving cell.

In an embodiment, for UE storage capability management when UE detects certain SCI associated with a SI-block or SI part/SI message is rarely broadcasted by the network in minimum SI then UE can delete the stored configuration corresponding to the less frequently broadcasted SCI.

In an embodiment, for UE storage capability management, UE prioritizes the storage of plurality of configurations corresponding to one or more SI-block(s) or SI part/SI message(s) for which the associated SCI change occurs more frequently during mobility from one cell to another compared to plurality of configurations corresponding to one or more SI-block(s) or SI part/SI message(s) for which the associated SCI is rarely detected in broadcast of minimum SI.

In an embodiment, the UE prioritizes the storage of plurality of configurations corresponding to essential-SI block(s) over plurality of configurations corresponding to other SI-block(s).

In an embodiment, the UE prioritizes the storage of plurality of configurations corresponding to SI-block(s) related to the service(s) in which UE is interested and essential SI-block(s).

In an embodiment, for SCI range management, if a certain SCI associated with a SI-block or SI part/SI message is broadcasted by network in minimum SI and the configuration corresponding to the SI-block is already provided to the UE then the same SCI value is not associated with a different configuration for the corresponding SI-block for a certain time period (e.g. 24 hours).

In an embodiment, the different numerologies supported by the cell is indicated in a SI-block comprising the RACH configuration which is either numerology specific or service specific or network slice specific.

Referring now to the drawings, and more particularly to FIGS. 1 through 9B, there are shown preferred embodiments.

FIG. 1 is an example illustration of Radio Access Network (RAN) deployment of next generation wireless system 100, according to an embodiment as disclosed herein.

In an embodiment, the next generation wireless system 100 includes a gateway (GW) 101, a set of UE's 102a, 102b, 102c, 102x, 102y, and 102z (hereafter, the label of the UE is 102), a set of 5G eNBs 103a, 103b (hereafter, the label of the 5G eNB is 103), a set of cells 104a, 104b (hereafter, the label of the cell is 104), and a set of Transmission Reception Points (TRPs) 105a, 105b, 105x, and 105y (hereafter, the label of the TRP is 105).

The UEs 102a-102c and 102x-102z may be dispersed throughout the next generation wireless system, and each UE 102 may be stationary or in mobility. The UE 102 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UE 102 can be, for example, but not limited to a cellular phone, a smart phone, a Personal Digital Assistant (PDA), a wireless modem, a wireless communication device, a handheld device, a tablet computer, a laptop computer, a wireless local loop (WLL) station, a Universal Serial Bus (USB) dongle, a wireless router, etc.

The 5G eNB 103 may also include or be referred to by those skilled in the art as a base station, a base transceiver station, a radio base station, an access point, a radio transceiver, a NodeB (eNB or gNB), or some other suitable terminology.

The gateway 101 can be connected to the 5G eNB 103 for handling the frequency carrier(s) in a cell coverage area. One 5G eNB 103 may be connected to more than one GW 101. Within the coverage of 5G eNB1 and 5G eNB2 103a and 103b, the plurality of UE's 102 support multiple RAT functionalities like (GSM, UMTS, LTE) and also next generation RAT functionalities (NR/5G) are served by one or more cell(s) 104. Regardless of the UE support type, each UE 102 can access at least one carrier based on next generation RAT (NR/5G).

In an embodiment, the 5G eNB 103 is configured to transmit a broadcast channel (i.e., a Primary Broadcast Channel (PBCH)) to at least one UE 102. The PBCH is a non-scheduled downlink broadcast channel. The UE 102 is configured to decode the PBCH to acquire the first MIB. Further, the UE 102 is configured to determine to bar a cell from which the first MIB is acquired for a pre-determined period of time or to acquire a second MIB transmitted on a Secondary Broadcast Channel (SBCH) by the base station (i.e., the 5G eNB 103) based on a cell barring indication included in the first MIB. The SBCH is a physical downlink shared channel (PDSCH) scheduled by a physical downlink control channel (PDCCH).

In an embodiment, the acquired first MIB is stored when the received cell barring indication is disabled and in various embodiments, the second MIB is acquired based on scheduling information included in the first MIB.

In various embodiments, the UE 102 is configured to bar the cell from which the first MIB is acquired for a pre-determined period of time when the received cell barring indication is enabled.

In some embodiments, the UE 102 is configured to determine whether to consider the cell from which the second MIB is acquired as a candidate cell for camping or bar the cell for a pre-determined period of time. In case, when the UE fails to acquire second MIB transmitted on the SBCH, then the UE 102 is configured to bar the cell for a pre-determined period of time.

In various embodiments, the UE is configured to consider the cell as a candidate cell for camping when essential system information parameters for cell selection and cell access are received in the acquired second MIB.

In another embodiment, when the UE acquires only the SCI from second MIB and UE neither receives essential parameters of minimum system information from cell broadcast nor has stored information associated with SCI acquired from second MIB then UE considers that cell as barred for a certain period of time.

The stored essential system information can be associated with at least one of: the SCI, the valuetag, the global cell identity and the area identifier.

In another embodiment, when the UE detects a cell which is not broadcasting the essential system information, UE considers this cell as a candidate for camping if UE already has essential system information for this cell wherein the UE may have obtained the said essential system information for this cell from another cell or another frequency or from pre-configuration or from a server.

In an embodiment, when the essential system information parameters are not received in the acquired second MIB, then the UE 102 is configured to determine whether it has valid stored essential system information parameters for cell selection and cell access based on at least one of: the SCI, the valuetag, the global cell identity (GCI) and the area identifier associated with the second MIB received in the acquired second MIB. In such case, it should be noted that the UE has obtained the stored essential system information parameters from another cell or another frequency.

Further, the UE 102 is configured to apply cell selection parameter(s) to camp on the cell (i.e., either the cell 104a or 104b) from which first MIB and second MIB are acquired. The cell selection parameter(s) are used from the information received in the acquired second MIB or the valid stored essential system information corresponding to the acquired SCI.

Further, the next generation wireless cellular system includes the cell 104a consists of a set of Transmission Reception Points (TRPs) 105. A fronthaul between 5G eNB 103a node and the TRPs 105 can be ideal or non-ideal. The TRPs 105 of one 5G cell 104a controlled by the 5G eNB 103 will operate to provide DL coverage beams. It is assumed all TRPs 105 belonging to the same cell are "time synchronized" i.e. same radio frame and System Frame Number (SFN) timing. However, in some implementation TRPs 105 may not be time synchronized. The radio frame duration of IMT-Advanced is 10 ms and the SFN range is 0-1023. The numerology of next generation RAT is assumed such that the IMT-Advanced radio frame is either multiple of radio frame of next generation RAT or radio frame of next generation RAT is exactly 10 ms. Therefore, the SFN range of next generation RAT is either 0-1023 or multiple of IMT-Advanced SFN range. This is needed to support co-existence of next generation RAT and IMT-Advanced RAT. This is also needed to support non-standalone deployment of next generation wireless system where the IMT-Advanced RAT acts as the mobility and RRC connection anchor. It is expected that the initial deployment of next generation wireless system operating in mmWave/cmWave bands would operate as non-standalone system to provide additional radio resources to the UE which would be connected to IMT-Advanced or previous generation system for coverage purpose. With the assumption that next generation wireless system would be added as a capacity layer to existing IMT-Advanced deployments then from the initial standardization phase perspective the RAN architecture would be based on mechanisms similar to Carrier Aggregation (CA) or Dual-Connectivity (DC) framework specified by 3rd Generation Partnership Project (3GPP).

The maximum number of DL coverage beams 'p' will typically depend on frequency used; i.e. can be larger in higher frequency bands due to smaller antenna separation at the TRPs 105 of 5G eNB (103). The cell 104 of the next generation wireless system is identified by a "physical Cell Identifier" (PCI) and a "global cell identifier" (GCI). The UE 102 can obtain the PCI from the Synchronization Signal (SS) transmitted by the 5G cell 104 of the next generation RAT and the GCI from the MSI broadcasted periodically on PBCH/SBCH by the 5G cell 104.

The UE 102 which supports legacy RAT, IMT-Advanced RAT and next generation RAT is aware of TRPs 105 of the next generation wireless system. The TRPs 105 operate together to provide beams to the UE and notion of TRP may or may not be visible to the UE. Therefore, if the TRP 105 is visible to the UE, then there is a "TRP Identifier (TRP-Id)" provided to the UE over the radio of next generation RAT.

Further, the UE 102 is aware of cell 104 of 5G eNB 103a, the TRP 105 and beams served by the respective TRP 105. The UE 102 shall detect and decode the Synchronization Signal and PBCH to determine the PCI and TRP-Id and also decode the Beam Index Sequence to determine a "Beam Identifier" (Beam-Id). Further, two types of DL beams are considered: 1) Coverage Beams and 2) Dedicated Beams.

The coverage beams transmitted by the TRPs 105 under the control of 5G eNB 103a provide the coverage for cell 104a of next generation system with a fixed set of directed coverage beams, also called as "grid of beams". Coverage beams cover a relatively wide area and can thus only support relatively low data rates. For example in a cell 104a there could be less than 10 DL coverage beams and more than 10 dedicated beams transmitted by each TRP. As an example each DL coverage beam from the respective TRP could cover 30-60 degree sector angle such that gird of coverage beams cover 100-250 m radius circular area. Each coverage beam is identified by a Beam-Id". The coverage beams transmit the Synchronization Signal (SS), PBCH and reference signals for beam signal strength measurements. These reference signals are generically referred as Beam Reference Signal (BRS) and used for Radio Resource Management (RRM) measurements. Coverage beams are used for transmitting DL common channel signaling e.g. RACH response. Coverage beams carry control channel transmissions like enhanced Physical Downlink Control Channel (ePDCCH) and user data Physical Downlink Shared Channel (PDSCH) can also be transmitted on coverage beams when dedicated beams to the UE have been lost. In next generation system where beamforming is not employed the multiple coverage beams is just a single beam transmitted from a direction antenna in the sector covering the cell. Operation with single beam or multiple beam in NR systems is a network implementation aspect. For demodulation purpose when ePDCCH/PDSCH is transmitted on coverage beam then Demodulation Reference Signal (DMRS) is also transmitted. Dedicated transmissions towards UE (ePDCCH/PDSCH) may potentially use even more directed and sharp beams (e.g. UE specific pre-coding) on so called "Dedicated Beams". Coverage area of dedicated beams would be much smaller in terms of beam width compared to coverage beams (e.g. ½, ¼ or ⅛th of coverage beam area).

Further, the dedicated beams are managed based on the UE measurement on Channel-State Information-Reference Signal (CSI-RS) and UE 102 provides CSI feedback at PHY or MAC layer. To demodulate ePDCCH/PDSCH carried on dedicated beams, DMRS is also transmitted on dedicated beam. Since UE 120 just sees DMRS kind of reference signals coming from the cell of the next generation system the notion of coverage beam and dedicated beam is transparent to the UE 102 for PDSCH reception point of view. However, notion of coverage beam is known to the UE for reception of synchronization signal and BRS measurement. Therefore, when TRPs of gNB (103a) detects the UE has lost dedicated beams based on CSI-RS measurement feedback and UE 102 is scheduled data on coverage beam then UE 02 will not be aware that whether the transmission is coming from a coverage beam. To the UE 102, this looks like any other transmission coming from a dedicated beam. Cell edge bitrates on coverage beams will be much lower than cell edge bitrates achievable by dedicated beams. The UE 102 transmission in the UL may also be carried on UL beams. However, the number of UL beams is expected to be less compared to the number of DL beams considering the UE size and number of antenna's at the UE 102.

The 5G cell parameters of the next generation RAT (i.e., system information) which are cell specific comprises of: DL/UL bandwidth, TDD configuration, PRACH configuration, PDSCH configuration, Physical Uplink Control Channel (PUCCH) configuration, PUSCH configuration, Sounding Reference Signal (SRS) configuration, UL power control configuration, MAC configuration, RLC configuration, PDCP configuration (i.e. user plane configuration or L1/L2 configuration) etc.

The system information containing the L1/L2 configuration in general is called the radio resource configuration information which needs to be provided to the UE for communication with the gNB. In addition the DL beam mobility measurement configuration which includes the CSI-RS configuration including the CSI-RS processes that points to the CSI-RS resource configuration including the Non-Zero Power (NZP), Zero Power (ZP) and Interference Measurement Resource (IMR) resources and the reporting configuration needs to be provided to the UE for beam mobility purpose.

Based on the CSI-RS configuration the UE in connected mode should monitor the NZP and IMR resources to perform CSI measurements that includes at least Channel Quality Indicator (CQI), Rank Indicator (RI), Precoding Matrix Index (PMI), CSI-RS RSRP measurements on the resources configured for the UE. There is also need to provide the UE with intra-frequency configuration, inter-frequency configuration and inter-RAT configuration to support idle mode mobility. The terms PRACH, Physical Downlink Shared Channel (PDSCH), Physical Uplink Control Channel (PUCCH), Physical Uplink Shared Channel (PUSCH), SRS for the physical channels of next generation RAT are used for simplicity so that someone with ordinary skills of the IMT-Advanced system can correlate with terms used in IMT-Advanced system.

The next generation wireless system needs to provide the UE with the cell specific parameters for accessing the cell, the (L1/L2) configuration i.e., radio resource configuration (both common and dedicated) and other configurations for idle mode mobility. Traditionally in legacy wireless system such parameters are periodically broadcasted in the cell coverage area in the form of one or more System Information Blocks (SIBs) in addition to the Master Information Block (MIB). On acquiring the MIB and SIBs related to cell access and idle mode mobility the UE can camp on a cell and then start initial access on the camped cell.

Consider for example that there are 4 DL coverage beams. MIB transmission with same periodicity as in LTE (i.e. 40 ms) and repetition every radio frame using 4 DL coverage beams. In a subframe MIB is transmitted using distinct DL coverage beam in distinct set of OFDM symbols. SIB 1 transmission with same periodicity as in LTE (i.e. 80 ms) and repetition in alternate radio frame using 4 DL coverage beams. In each radio frame for SIB 1 transmission, PDCCH indicating PDSCH resources for SIB1 and PDSCH carrying SIB1 is transmitted multiple times using distinct DL coverage beams in distinct subframes.

The overhead (time/frequency resources) of transmission of just MIB and SIB1 using beam forming is P times more than transmission of MIB/SIB1 without beam forming. 'P' is the number of DL transmission beams. The transmission resources remaining after resources consumed by system information (i.e., MIB/SIB1) may be only used for data scheduling for a user in the direction of the DL transmission beam. Therefore, if more time/frequency resources are consumed by system information due to beam sweeping then user data scheduling becomes restrictive and inflexible. In case of SIB1 message, PDCCH overhead also increases by P times as PDCCH is also transmitted using beamforming. The resource constraint and signaling overhead problem is also applicable for other SI messages. For SI messages the SI window size also increases by P times leading to increased UE wakeup time.

In a system where there is no beamforming (typically at low frequencies), the other issue is energy efficiency. According to release 13 LTE specification, 20 SIBs are supported. Only few SIBs are needed for basic LTE operation and other SIBs are for specific feature (e.g. Interworking with WLAN, D2D, MBMS, etc) or specific RATs (GERAN, UTRA, CDMA2000). These SIBs are periodically broadcasted and unnecessary in following scenarios: i) If all the UEs in the cell have already read the required system information and no new UE is entering the cell at periodicity at which system information is transmitted then periodic broadcast of system information in that cell is unnecessary and leads to wastage of resources and energy consumption; ii) if there is no UE in a cell interested in a specific service, then periodic broadcast of service specific system information in that cell is unnecessary and leads to wastage of resources and energy consumption. For example, if there is no UE in a cell interested in D2D service, then cell broadcasting SIB 18/SIB 19 is unnecessary.

One of the requirements for 5G systems is energy efficiency; so the design of system information provisioning needs to address the energy efficiency requirement to minimize always ON periodic broadcast. Another aspect related to broadcasting of system information is high signaling overhead in the context of 5G operation in higher frequency bands (above 10 GHz) where DL beam sweeping operation is inevitable to reach the coverage area of the cell. Broadcasting all the SIBs on the coverage beams which are subject to DL beam sweeping may lead to excessive signaling overhead and resource restriction. Therefore another design criterion for system information provisioning needs to address the signaling overhead aspect. There can be several mechanisms to reduce system overhead. For example, in order to reduce system overhead, essential system information such as SFN, system BW, cell barring indication, cell access parameters etc can be broadcasted periodically on PBCH whereas other system information can be either dedicatedly signaled or can be broadcasted based on UE request.

In light of the above context, various embodiments of the provide mechanisms for accessing the cell 104 and to request the 5G eNB 103 for on demand SIBs.

Figure 2A:
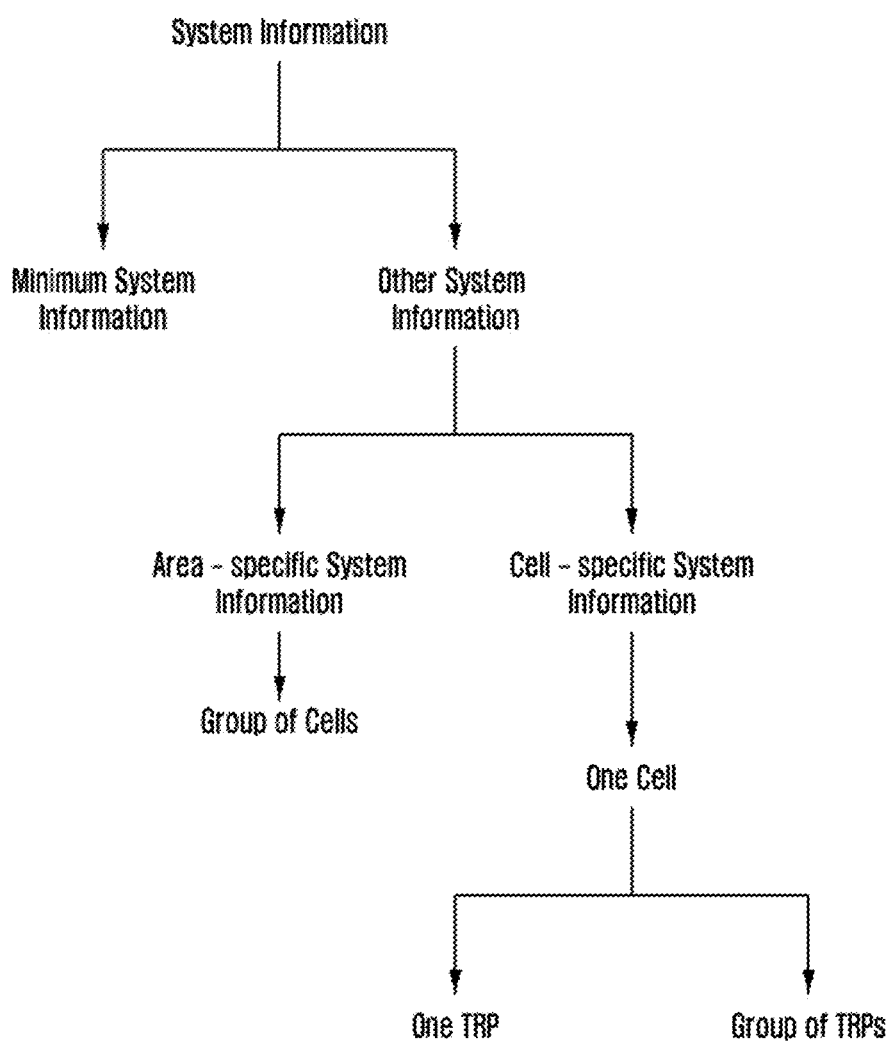
FIG. 2A shows a high level categorization of System Information (SI), according to an embodiment as disclosed herein.

FIG. 2A shows a high level categorization of System Information (SI), according to an embodiment as disclosed herein.

As depicted in the FIG. 2A, the SI provisioned in the 5G cell 104 is divided into MSI (i.e., the Minimum SI) and Other System Information (OSI). The Minimum SI is always autonomously and periodically broadcasted by the network. The contents of minimum SI at least include information which provides the following functionality: a) information to support cell selection; b) information to access the camped cell, c) information for requesting the Other SI and scheduling information for any broadcast SI. Some of the contents of MSI is broadcasted on the PBCH in a first MIB and remaining contents of MSI is broadcasted on the SBCH in a second MIB The PBCH is a non-scheduled downlink broadcast channel and the SBCH is a PDSCH scheduled by a PDCCH. The second MIB is commonly referred as System Information Block Type 1 (SIB1). The MSI consists of a first MIB and a second MIB i.e. SIB1. The Other SI (i.e., the OSI) comprises everything not broadcasted in the MSI. The Other SI in the form of SI-block(s) can be provided to the UE(s) on demand or periodically broadcasted depending on network decision. The Other SI may either be broadcast or provided to UE in a dedicated manner.

It is possible that some SI-block(s) have a set of SI parameters or configurations which is same or common for all cells/TRPs/Beams in the area. This is shown as Area-specific SI or can be referred as Common SI which has other SI-block(s) with the same set of SI parameters in the area applicable to a group of cells. Further some parameters can be cell-specific like the cell re-selection parameters. Such parameters can be associated with SI-block corresponding to cell-specific information applicable to a cell comprising one or group of TRPs depending on the cell deployment. The UE 102 needs to know the other SI-block(s) supported in the cell and whether it is broadcast or can be requested on demand (e.g. by checking the minimum SI or more specifically checking the second MIB i.e. SIB1). The UE 102 in idle or inactive state should be able to request the Other SI-block(s) without requiring a state transition.

Figure 2C:
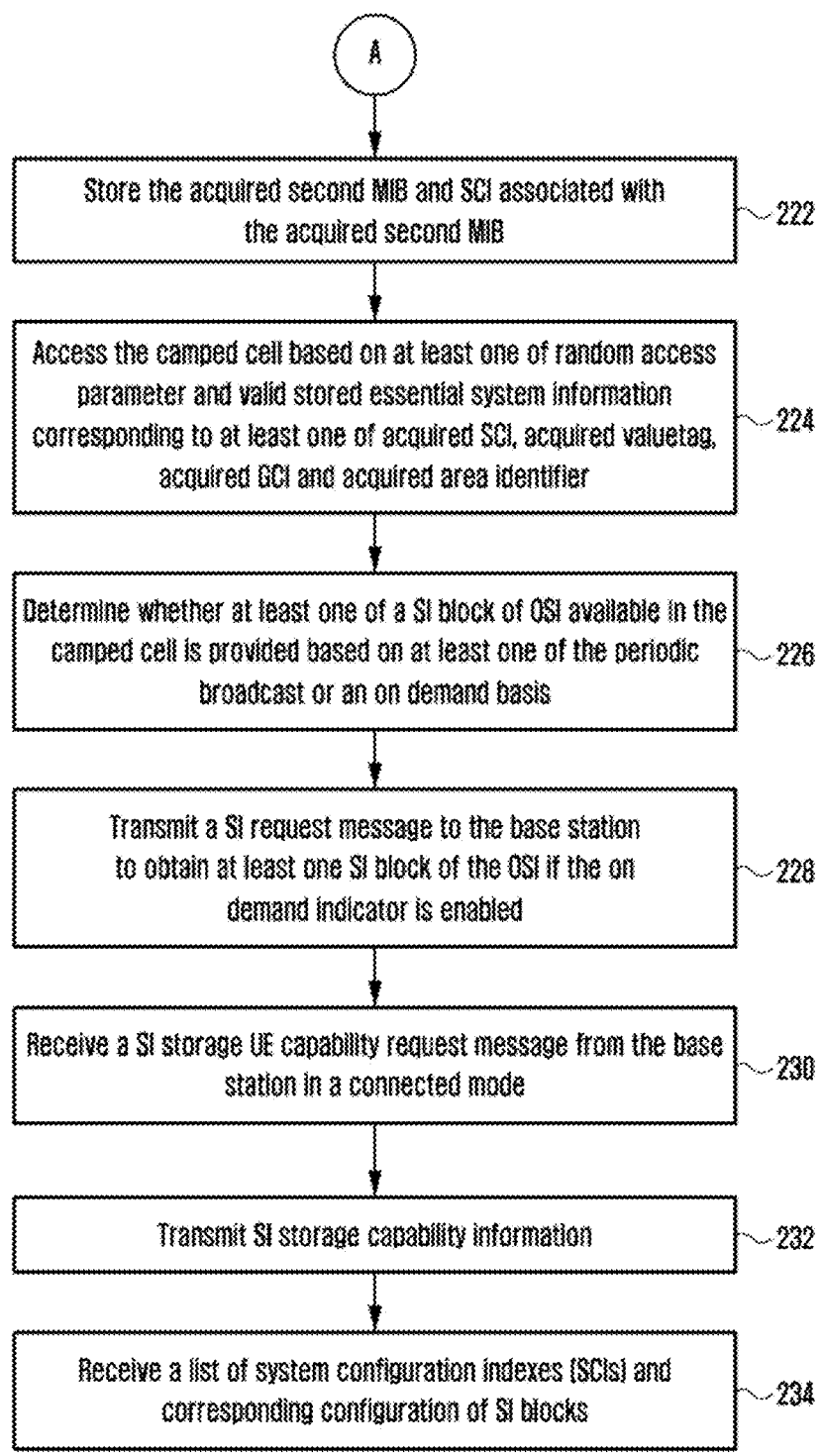

FIGS. 2B and 2C are flow charts 200 illustrating a method for provisioning MSI for the UE 102 in the wireless communication system 100, according to an embodiment as disclosed herein.

At step 202, the method includes decoding a PBCH to acquire a first MIB periodically transmitted by the base station. The base station (i.e., gNB 103) periodically transmits the first MIB on the non-scheduled PBCH and the second MIB on the scheduled SBCH. The UE 102 is configured to decode the PBCH to acquire the first MIB which includes SFN, cell barring indication and scheduling information for the second MIB. The details of PBCH and SBCH transmission are further elaborated in FIG. 3.

At step 204, the method includes determining whether a cell barring indication is received in the first MIB. The UE 102 is configured to determine whether the received cell barring indication in the acquired first MIB is enabled or disabled. In case, the received cell barring indication is enabled in the acquired first MIB, then at step 206, the method includes barring the cell for a pre-determined period of time. The UE 102 is configured to bar the cell (from which the first MIB is acquired) for a pre-determined period of time when the received cell barring indication is enabled in the acquired first MIB.

In case, when the received cell barring indication is disabled as determined at step 204, then at step 208, the method includes storing the acquired first MIB i.e. storing the contents of first MIB. The UE 102 is configured to store the acquired first MIB. After storing the acquired first MIB, at step 210, the method includes acquiring second MIB based on scheduling information received in the acquired first MIB. The UE 102 is configured to acquire the second MIB based on the scheduling information included in the first MIB. The second MIB comprises the remaining contents of MSI not included in the first MIB. The contents of second MIB i.e. the configuration of parameters corresponding to second MIB can be associated with at least one of: the SCI, the valuetag, the GCI and an area identifier. The second MIB also includes at least one of: the SCI, the valuetag, the GCI and an area identifier. At step 212, the method includes determining whether the second MIB transmitted on the SBCH by the base station 103 can be acquired or not based on the scheduling information included in the first MIB.

The acquired second MIB is referred as System Information Block Type 1 (SIB1) and the SBCH is a physical downlink shared channel (PDSCH) scheduled by a physical downlink control channel (PDCCH).

In case, when the UE fails to acquire the second MIB and cannot receive any contents of the second MIB, then at step 214, the method includes barring the cell for a pre-determined period of time. The UE 102 is configured to bar the cell for a pre-determined period of time when the second MIB transmitted on the SBCH is not acquired.

In case, at step 212, if it is determined that the second MIB is acquired i.e. UE is able to receive the contents of the second MIB, then at step 216, the method includes determining whether to camp on the cell from which the second MIB is acquired. In an embodiment, the UE 102 considers the cell as a candidate cell for camping by determining the reception of essential system information parameters for cell selection and cell access in the acquired second MIB.

At step 218, the method includes camping on the cell when the essential system information parameters are received in the second MIB. The UE 102 is configured to camp on the cell based on the essential system information parameters (i.e. cell selection parameters) received in the acquired second MIB. During mobility from one cell to another cell the UE determines suitable cell based on cell selection parameters while the camping on another cell is based on cell re-selection parameters included in SI-block of OSI.

In some embodiments, when the essential system information parameters are not received in the acquired second MIB, then at step 220, the method includes camping on the cell based on valid stored system information parameters for cell selection and cell access corresponding to SCI, valuetag, Global Cell Identity (GCI) and area identifier associated with the second MIB. It should be noted that, the UE 102 has obtained the stored essential system information parameters corresponding to second MIB from some another cell or another frequency.

In case at step 216, if it is determined that the UE 102 cannot camp on the cell due to one of: absence of essential system information parameters in the received second MIB or in case when the UE has no valid stored system information associated with SCI, valuetag, GCI or area identifier received in the acquired second MIB, then the method loops back to the step 214, where the cell from which the second MIB is acquired is barred for a pre-determined period of time. The UE 102 is configured to bar the cell from which second MIB was attempted to be acquired for a pre-determined period of time, in the absence of essential system information parameters and when the UE 102 has no valid stored system information associated with SCI, valuetag, GCI or area identifier received in the second MIB. In such scenario, when the cell from which first MIB and second MIB was attempted to be acquired is barred for a pre-determined period of time, the UE 102 starts detecting synchronization signals from another cell and upon detection of another cell, attempts to decode PBCH transmitted by the detected cell (i.e., the method loops back to step 202).

It should be noted that the acquired second MIB is referred as System Information Block Type 1 (SIB1) and the SBCH is a physical downlink shared channel (PDSCH) scheduled by a physical downlink control channel (PDCCH).

If at step 218 or at step 220 the UE is able to camp on the cell from which second MIB was acquired then at step 222, the method includes storing the acquired second MIB and at least one of: the acquired SCI, the acquired valuetag, the acquired GCI and the acquired area identifier associated with the acquired second MIB. The UE 102 is configured to store the acquired second MIB and at least one of: the SCI, the valuetag, the GCI and the area identifier associated with the acquired second MIB.

At step 224, the method includes accessing the camped cell based on at least one of random access parameter received in the acquired second MIB and valid stored essential system information corresponding to at least one of: acquired SCI, acquired valuetag, acquired GCI and acquired area identifier. The UE 102 is configured to access the camped cell on at least one of the random access parameter and the valid stored essential system information corresponding to at least one of: acquired SCI, acquired valuetag, acquired GCI and acquired area identifier.

At step 226, the method includes determining whether at least one of a SI block of OSI available in the camped cell is provided based on at least one of the periodic broadcast or an on-demand basis. The UE 102 is configured to determine whether at least one of a SI block of OSI available in the camped cell is provided based on at least one of the periodic broadcast or an on-demand basis. In an embodiment, the on-demand basis to deliver the SI block of the OSI available in the camped cell is decided based on at least one of an indication or a flag included in the acquired second MIB. If the on-demand indicator is disabled the corresponding SI-block is broadcasted whereas if the on-demand indicator is enabled the UE needs to send a SI request message to acquire the corresponding the SI-block. Further details of step 224 are elaborated in FIG. 4.

At step 228, on determining the on-demand indicator is enabled the method includes transmitting a SI request message to the base station (i.e., gNB 103) to obtain at least one SI block of the OSI. The UE is configured to transmit the SI request message to the base station (i.e., gNB 103) to obtain at least one SI block of the OSI. There are two methods for sending the SI request message which are further elaborated in FIG. 5 and FIG. 6B.

In an embodiment, transmitting the request message to the base station to obtain at least one SI block of the OSI comprises determining reservation of one of: at least one physical random access channel (PRACH) preamble and a plurality of PRACH resources. It should be noted that the reservation of PRACH preambles and PRACH resources is indicated in the acquired second MIB. The UE 102 is configured to transmit the request message to the base station to obtain at least one SI block of the OSI comprises determining reservation of one of: at least one physical random access channel (PRACH) preamble and the plurality of PRACH resources.

In an embodiment, the request message transmitted to the base station is a SI request message for obtaining at least one SI block of the OSI, after determining that at least one PRACH preamble is not reserved and plurality of PRACH resources are not reserved as indicated in the acquired second MIB.

The UE 102 is configured to transmit the SI request message in response to a Random Access Response (RAR) message received from the base station for a PRACH preamble transmission. The RAR provides the UL grant to transmit the SI request message. The transmitted PRACH preamble is an unreserved preamble selected randomly from a plurality of PRACH preambles. The details of this method are further elaborated in FIG. 5.

In another embodiment, the request message transmitted to the base station is a PRACH SI preamble to obtain at least one SI block of the OSI when the at least one PRACH preamble is reserved as indicated in the acquired second MIB.

In another embodiment, the request message transmitted to the base station is a PRACH SI preamble to obtain at least one SI block of the OSI, when there is a plurality of PRACH resources reserved, as indicated in the acquired second MIB, and the reserved PRACH resource is a time-frequency resource.

The UE 102 is configured to transmit the PRACH SI preamble on the reserved time-frequency PRACH resource for obtaining at one SI block of the OSI. The transmitted PRACH SI preamble is an unreserved preamble selected randomly from a plurality of PRACH preambles. The details of this method are further elaborated in FIG. 6B.

At step 230, the method includes receiving a SI storage UE capability request message from the base station in a connected mode. The UE 102 is configured to receive the SI storage UE capability request message from the base station in a connected mode.

At step 232, the method includes transmitting the SI storage capability information. The UE 102 is configured to transmit the SI storage capability information. The details of steps 230 and 232 are further elaborated in FIG. 7.

At step 234, the method includes receiving a list of SCIs and corresponding configuration of SI blocks. The UE 102 is configured to receive the list of SCIs and corresponding configuration of SI blocks. In an embodiment, the received list of SCIs and corresponding configuration of SI blocks are stored by the UE 102. Further, the UE discards SCIs and corresponding configuration of SI blocks acquired from different cells other than the camped cell, based on expiry of a validity timer associated with stored SI blocks.

In an embodiment, the storage of configuration of SI blocks is managed wherein the UE 102 is configured to prioritize the associated SCI(s) changing frequently than a plurality of configuration corresponding to one or more SI-block(s) for the associated SCI(s) rarely received in the acquired MSI.

The various actions, acts, blocks, steps, or the like in the flow diagram 200 may be performed in the order presented, in a different order or simultaneously. Further, in some embodiments, some of the actions, acts, blocks, steps, or the like may be omitted, added, modified, skipped, or the like without departing from the scope of the invention.

Figure 3:
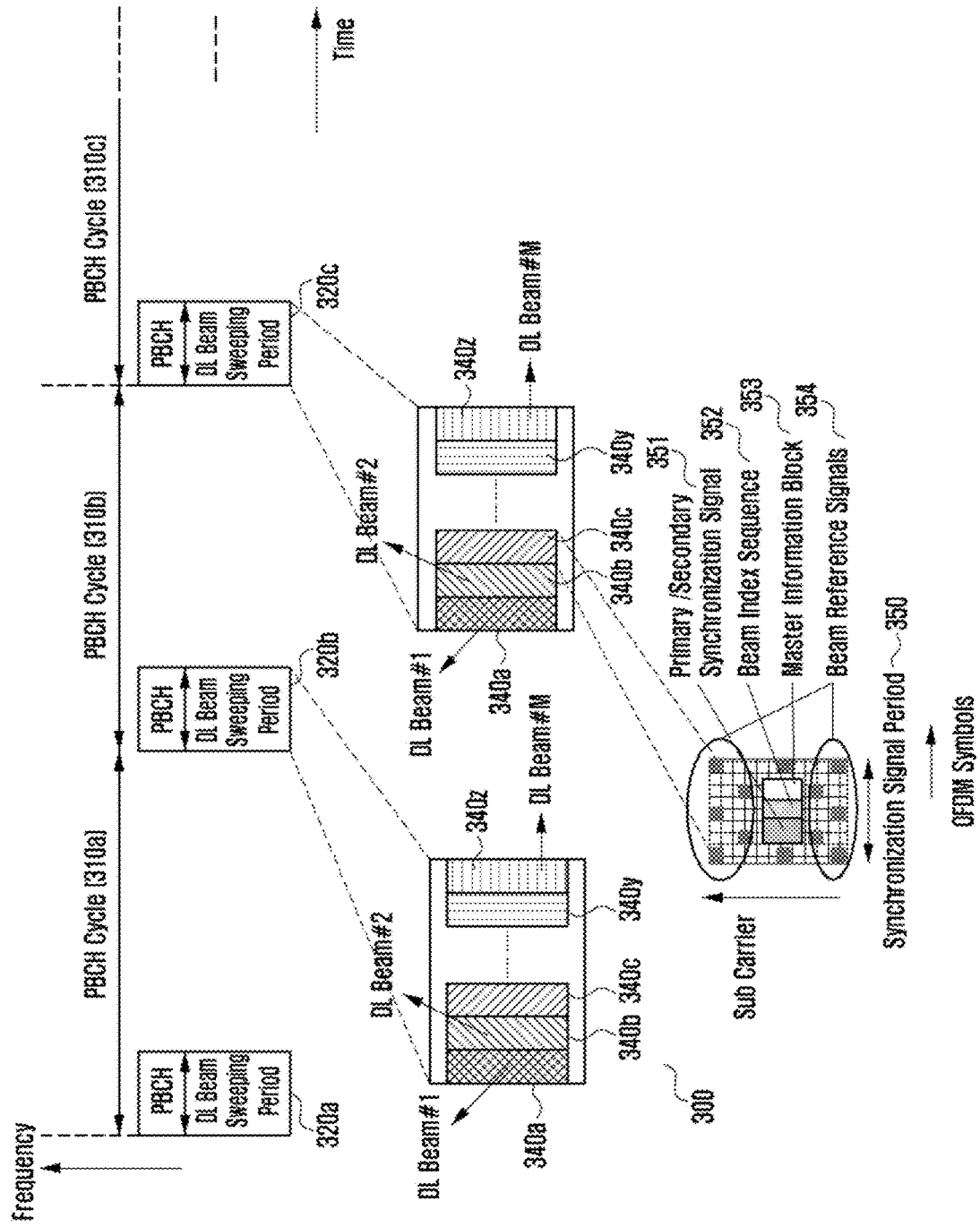
FIG. 3 is an example illustration in which Primary Broadcast Channel (PBCH) is broadcasted from a cell of next generation wireless system, according to an embodiment as disclosed herein.

FIG. 3 is an example illustration 300 in which PBCH is broadcasted from a cell 104 of next generation wireless system 100, according to an embodiment as disclosed herein. A default PBCH cycle which is frequency agnostic or frequency dependent can be specified in 3GPP specifications. As an example the default PBCH cycle (310a, 310b, 310c and so on) can be specified as 20 or 40 ms. The PBCH transmission is subject to DL beam sweeping over plurality of DL coverage beams in order to reach UEs in entire cell coverage area. The PBCH carries the physical Synchronization Signal (SS) i.e. primary and secondary SS, first the Master Information Block (Block) comprising at least some contents of the MSI and Beam reference signals (BRS) distributed in frequency domain. The PBCH is blindly detected by the UE during each synchronization signal period (350). It is to be noted the PBCH is a non-scheduled downlink broadcast channel. The PBCH cycle denotes the PBCH periodicity wherein the same contents of MIB can be repeated within the PBCH periodicity. The contents of MIB change across PBCH periodicity boundary. The DL beam sweeping period (320a, 320b, 320c so on and so forth) comprising the PBCH aligns with the start of the radio frame of the cell since the PBCH period includes the physical synchronization signals. During the DL beam sweeping period (320a, 320b, 320c, etc.) plurality of DL coverage beams (340a, 340b, 340c . . . 340y, 340z) are transmitted consecutively in time in different directions to provide coverage to UEs in the area covered by sweeping the beams. The PBCH is transmitted during the synchronization signal period (350) which may or may not cover all the OFDM symbols within the Transmission Time Interval (TTI) of next generation RAT depending on the exact physical layer design.

The synchronization signal period (350) consist of plurality of OFDM symbols of NR and cover the minimum bandwidth consisting of plurality of subcarriers required for the transmission of at least the synchronization signal (351), beam index sequence (352), Master Information Block (MIB) (353) comprising at least some contents of the minimum system information and beam reference signals (BRS) (354). The synchronization signal (351) consists at least the primary synchronization signal (i.e., PSS), the secondary synchronization signal (i.e., SSS) and the beam index sequence (352). The PSS/SSS (351), beam index sequence (352) and MIB (353) are transmitted on plurality of OFDM symbols and plurality of subcarriers during the PBCH period or synchronization signal period (350) subject to beam forming logic associated with DL beam index#1 (340a). The beam index sequence (352) indicates the DL beam index#1. The block containing the PSS/SSS (351), MIB (353), beam index sequence (352) and BRS (354) can be transmitted as a single burst (320a) or set of bursts (320aa, 320aaa so on and so forth). Therefore the PBCH cycle (310a, 310b, 310c so on and so forth) represent the periodicity of the PBCH or the periodicity of SS burst set. In the next synchronization period (350) the PSS/SSS (351), beam index sequence (352) indicating the DL beam index#2 and MIB (353) are transmitted on plurality of OFDM symbols and plurality of subcarriers subject to beam forming logic associated with DL beam index#2 (340b). This is referred as DL beam sweeping on PBCH wherein the PSS/SSS (351), beam index sequence (352) indicating the DL beam index#M and MIB (353) are transmitted on plurality of OFDM symbols and plurality of subcarriers in the mth PBCH period or synchronization period (350) subject to beam forming logic associated with DL beam index#M (340z). On blindly decoding the PSS/SSS (351) and beam index sequence (352), the UE determines the Physical Cell Identity (PCI) and the timing compensation to be applied to determine the radio frame boundary of the cell transmitting the synchronization signal. The beam reference signals i.e., BRS (354) are reference signals transmitted on plurality of OFDM symbols and plurality of subcarriers excluding the resources occupied by PSS/SSS (351) and beam index sequence (352). The resources used for transmitting the BRS (354) on DL beam index#m depend on the PCI of the cell and the DL beam index. The BRS (354) is transmitted during the synchronization period (350) subject to the corresponding beam forming logic associated with DL beam index#m. In the FIG. 3, the first beam during the DL beam sweeping period is depicted DL beam index#1 and subsequent beams in time as DL beam index#2 so on and so forth. Such a depiction should not be considered as a limiting case because the starting beam can be any beam uniquely identified by the beam index sequence subject to maintaining the beam sequence and the number of beams same during the DL beam sweeping period. For e.g. the starting beam can be DL beam index#11 followed by DL beam index#12 while keeping the number of beams during the DL beam sweeping period equal to M.

After decoding the PSS/SSS (351) and beam index sequence (352); UE come to know the PCI and the DL beam index; hence the resources where it can perform measurements at physical layer on BRS. These measurements indicate the estimate of signal strength of beam index#m and reported to higher layer for cell mobility evaluations. Generically these measurements are termed as BRS Reference Signal Received Power (BRS_RSRP) and BRS Reference Signal Received Quality (BRS_RSRQ) providing an estimate of signal strength on received beam from the cell detected by the UE. The UE needs to camp on the NR cell based on the BRS measurements i.e., BRS_RSRP/BRS_RSRQ of one or more coverage beams which can be summed or combined with some logic to derive cell quality metric used for idle mode mobility or inactive mode mobility during cell selection and/or cell re-selection. It may not be possible to accommodate that the most essential or most important parameters (i.e. all the contents of MSI) in the MIB. This depends on the coverage requirement and physical layer design. If it is not possible to accommodate all the contents of minimum SI in one MIB then the parameters are distributed in two blocks i.e. MIB#1 and MIB#2. In such scenario MIB#1 is transmitted on PBCH while MIB#2 is transmitted on Secondary Broadcast Channel (SBCH). In such scenario the MIB transmitted on PBCH in FIG. 3 is referred as first MIB. The SBCH can be Physical Downlink Shared Channel (PDSCH) scheduled by Physical Downlink Control Channel (PDCCH). The MIB#1 transmitted on the PBCH is of fixed size while the MIB#2 i.e., SIB1 transmitted on the SBCH is of variable size.

Similar to the PBCH cycle, a SBCH cycle which is frequency agnostic or frequency dependent can be specified in 3GPP specification. For example if the PBCH cycle (310a, 310b, 310c so on and so forth) is 20 ms then the SBCH cycle can be specified as 40 or 80 ms or some other value. The SBCH cycle can also be indicated in PBCH. The SBCH cycle denotes the SBCH periodicity wherein the same contents of MIB#2 can be repeated within the SBCH periodicity. The contents of MIB#2 i.e. second MIB change across SBCH periodicity boundary. The scheduling information included in the first MIB (MIB#1) indicates at least periodicity of the second MIB (MIB#2), namely, SIB1 transmitted on the SBCH. The scheduling information included in the first MIB (MIB#1) also indicates the resource information to receive the PDCCH for the PDSCH on which the second MIB (i.e. MIB#2) is scheduled. Apart from the scheduling information the first MIB includes a cell barring indication, wherein if the cell barring indication is set enabled, then the Cell 104 is considered as barred by the UE 102 for a certain pre-determined period of time. In case of beamforming, the PBCH and SBCH transmission are subject to DL beam sweeping over plurality of DL coverage beams in order to reach UEs in entire cell coverage area. An offset between the PBCH and SBCH can either be specified as default offset or can be indicated in the MIB#1 transmitted on PBCH.

In an embodiment, the minimum system information comprises one or more of: system frame number (SFN), PLMN-Id, parameters to support cell selection i.e. camping parameters, barring information to access the camped cell i.e. related to cell access, cell barring indication, indicator(s) whether other SI-block(s) periodically broadcasted or provided on demand i.e. UE request, configuration for requesting other SI-block(s) if on demand mechanism is allowed (e.g., RACH like), SCI for each of the other SI-block(s) regardless of periodic broadcast or provided on demand, global cell identifier, area identifier, scheduling information for broadcasted SI-block(s) i.e. related to SI-block(s) periodically broadcasted, bitmap indicating which SI-block(s) are supported by the cell.

In some embodiments, one or more Master Information Block (MIB) of different size is defined and UE 102 identifies the size of MIB based on detection of synchronization signal; wherein different synchronization signals are used for different MIB size.

In various embodiments, one or more MIB of different size is defined and UE 102 identifies the size of MIB based on detection of synchronization signal; wherein one of the primary synchronization signal (PSS) or the secondary synchronization signal (SSS) is different for different MIB size.

In some embodiments, the MIB size is dependent on the frequency of operation; wherein the MIB size is pre-defined for different operating frequency or operating frequency range.

In various embodiments, the MIB size is determined based on blind decoding of the block comprising minimum SI and performing the CRC check on the decoded block by the UE 102.

In some embodiments, there can be multiple MIB(s) defined wherein the size of the first MIB is fixed and the size of the second MIB is indicated in the first MIB or determined based on one of the primary or secondary synchronization signal or blindly decoded by the UE 102 or variable in size.

In some embodiments, there can be multiple MIB(s) defined wherein the periodicity of the first MIB is fixed and the periodicity of the second MIB is indicated in the first MIB. In various embodiments, there can be multiple MIB(s) defined wherein the presence of the second MIB is indicated in the first MIB.

The other parameters equivalent to LTE SIB1 and SIB2 which is the essential system information can be considered as contents of minimum SI. Therefore the cell-specific information such as cell selection parameters, random access parameters and contents of minimum SI which cannot be accommodated in MIB#1 can be constructed as an SI-block called as MIB#2. For the sake of understanding let us term the contents of MIB#1 as minimum SI and the other contents of minimum SI and cell-specific parameters accommodated in MIB#2 as essential SI. This SI-block i.e. MIB#2 can be transmitted on SBCH or can also be requested on demand like other SI-block(s). The MIB#2 comprising essential SI if broadcasted periodically on the SBCH is decoded by the UE during the SBCH period similar to the PBCH period. The contents of the MIB#2 can be associated with at least one of: a system configuration identifier/index (SCI), a valuetag, global cell identifier (GCI) and area identifier. The DL beam sweeping period during SBCH transmission contains the MIB#2 block and optionally BRS. During the DL beam sweeping period of SBCH plurality of DL coverage beams are transmitted consecutively in time in different directions to provide coverage to UEs in the area covered by sweeping the beams. The number of beams used for PBCH and SBCH transmission is same. The SBCH may be addressed on the PDCCH/ePDCCH by the SI-RNTI. The SBCH period consist of plurality of OFDM symbols and plurality of subcarriers of next generation such that the MIB#2 may occur in the minimum bandwidth or some other frequency resources of the entire DL system bandwidth. The size of the MIB#2 can be indicated in MIB#1 or in the DCI addressed by SI RNTI.

The requirement to limit broadcast information in NR system employing beamforming can be made possible if a large majority of parameters is not directly visible on periodic broadcast but only provided on UE request. This includes the Other SI-block(s) and possibly the MIB#2 as well. In an embodiment, the System Configuration Index or System Configuration Identifier (SCI) is an index/identifier which is associated with a set of system information parameters and corresponding parameter values of a SI-block which are provided by the network on UE request or broadcasted by the network. In NR system the MIB#1 and MIB#3 is required to provide at least system information to enable the UE 102 to camp on a cell and perform an initial access to send a request and receive a response to receive the Other SI. In the present disclosure the system information provisioned on demand or UE request is referred as "Other SI".

Figure 4:
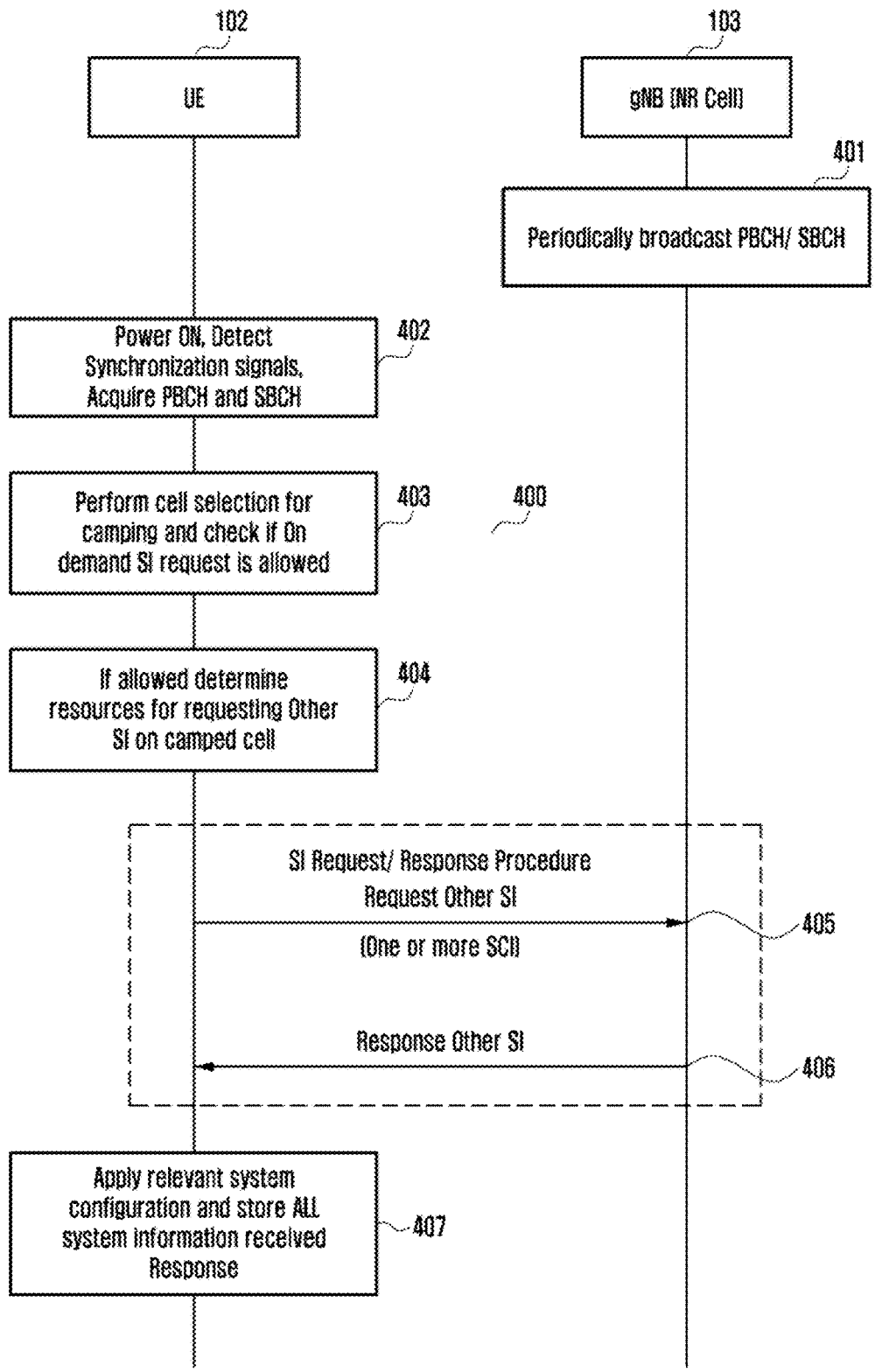
FIG. 4 is a sequence diagram illustrating various signaling messages for provisioning of SI based on request from the UE, according to an embodiment as disclosed herein.

FIG. 4 is a sequence diagram illustrating various signaling messages for provisioning of SI based on request from the UE, according to an embodiment as disclosed herein. As depicted in the FIG. 4, at step 401, the 5G eNB or the gNB 103 periodically broadcasts the MSI i.e. MIB#1 and essential SI i.e. MIB#2 on the PBCH/SBCH. At step 402, after the UE 102 powers ON, the UE 102 radio circuitry starts scanning the radio frequency to detect synchronization signals transmitted every PBCH cycle.

In deployments, where the radio frequency belongs to mmWave/cmWave bands, the PBCH is subjected to beamforming techniques including the beam sweeping operation. After detecting the synchronization signals and beam index sequence, the UE 102 blindly decodes the PBCH on which MIB#1 comprising some contents of MSI is broadcasted. The MIB#1 includes the SFN, cell barring indication and scheduling information to acquire the MIB#2.

At step 403, after acquiring the MIB#2 the UE 102 camps on the cell 104 based on at least the cell selection, PLMN selection parameters and cell barring parameters included in the MIB#2. The other parameters of MSI and cell-specific parameters such as random access parameters included in MIB#2 are acquired after decoding SBCH if MIB#2 is periodically broadcasted.

At step 404, the UE 102 determines the resources to access the camped cell based on the configuration parameters for sending SI request acquired from the minimum SI transmitted by the camped cell. In the MSI the gNB 103 also broadcasts one or more SCI, one or more valuetags, global cell identifier (GCI) and area identifier. Each SCI or valuetag correspond to a SI block i.e. a set of system information parameters and corresponding parameter values applicable for that SI block supported in the cell. Since UE (102) has powered ON in the step 402, it does not have any stored system information, so the UE 102 does not know the meaning of the one or more SCIs acquired from minimum SI. The UE 102 needs to determine whether the required other SI-block(s) needs to be acquired from broadcast or can be acquired on demand by requesting from the gNB 103 serving the 5G cell 104.

In an embodiment, the System Configuration Index or System Configuration Identifier (SCI) or a valuetag is an index/identifier which is associated with a set of system information parameters and corresponding parameter values of a SIB-block which is provided by the network either on periodic broadcast or on UE request.

In some embodiments, the plurality of SCI and some contents of the MSI is transmitted in at least one SI block called the master information block (MIB).

In various embodiments, the UE 102 detects whether it is allowed to request one or more other SI-block(s) from network based on one or more of: the on demand indicator in minimum system information, the bitmap concerning supported SI-block(s) in the cell and the scheduling information related to SI-block(s) transmitted in the MSI.

In some embodiments, each bit in the bitmap concerning supported SI-block(s) in the cell indicates whether the corresponding SI-block or SI part/SI message is supported by the cell or not.

In various embodiments, the UE 102 detects whether it is allowed to request one or more other SI-block(s) from the network (i.e., 5G eNB or gNB 103) based on the bitmap concerning supported SI-block(s) in the cell 104 and the absence of scheduling information related to SI-block(s) indicated as supported by the bitmap.

In various embodiments, the UE 102 detects whether it is allowed to request one or more other SI-block(s) from network (i.e., 5G eNB or gNB 103) based on the bitmap concerning supported SI-block(s) in the cell and the presence of on demand indicator for those SI-block(s) indicated as supported by the bitmap.

In some embodiments, the 102 UE detects whether it is allowed to request one or more other SI-block(s) from network (i.e., 5G eNB or gNB 103) based on the presence of on demand indicator and absence of scheduling information related to SI-block(s) determined from scheduling information transmitted in the MSI.

In some embodiments, the UE 102 detects whether it is allowed to request one or more essential SI-block(s) from network (i.e., 5G eNB or gNB 103) based on absence of scheduling information related to SI-block(s) in the MSI; wherein the essential SI-block(s) are mandatory SI-block(s) like LTE SIB1, SIB2 etc.

In various embodiments, the UE 102 detects whether it is allowed to request one or more essential SI-block(s) from network (i.e., 5G eNB or gNB 103) based on the presence of on demand indicator for one or more essential SI-block(s) in minimum SI; wherein the essential SI-block(s) are mandatory SI-block(s) like LTE SIB1, SIB2 etc.

In some embodiments, multiple SCI or valuetags are broadcasted in minimum system information wherein each SCI or valuetag is associated with SI-block (or SI part or SI message) provided in other system information either through periodic broadcast or by UE request i.e. on demand.

In an embodiment, at least one of SCI, valuetag, GCI or area identifier is broadcasted in MIB#2 wherein SCI or valuetag or GCI or area identifier is associated with configuration of the SI-block (i.e. MIB#2 configuration) transmitted on SBCH.

In various embodiments, a SI-block or SI message concern a set of parameters that are functionality related and hence some similar scheduling requirements.

Before initiating the request for acquiring the Other SI-block(s) associated with the one or more SCI values acquired from MIB, UE 102 checks the status of on demand indicator or flag acquired from the MSI, the bitmap concerning supported SI-block(s) in the cell 104 and the scheduling information related to SI-block(s) transmitted in MSI at step 404. The broadcast indicator can be for each SI-block or for a set of SI-block(s).

Depending on the SI-block(s), relevant for the cell, the SCI associated with the SI-block, the scheduling information and the SI request configuration can be organized together in MIB#2. Then instead of an explicit on demand indicator a bitmap to indicate the relevant SI-block(s) supported in the cell 104 needs to be included in the MSI. Based on the bitmap indicating supporting SI-block(s) in the cells 104, the following information can be grouped: a) SCI or valuetag associated with the SI-block, b) If periodically broadcasted: scheduling information of the SI-block and c) If not periodically broadcasted: configuration to request SI-block.

If the network (i.e., 5G eNB or gNB 103) is not broadcasting the Other SI-blocks, then the UE 102 is required to initiate the procedure to request the SI-block(s) it requires.

At step 405, based on the SI request configuration parameters and resources configured for cell access, the UE 102 transmits or sends the request for obtaining the OSI. The request-response procedure as shown in the FIG. 4 may be a 2-step procedure or may involve more than two steps.

The request may be in the form transmitting a preamble on a PRACH resource or some form of physical layer signal. The gNB 103 either detects the transmitted preamble or performs energy detection to identify the UE 102 has sent a request for the OSI.

If the request-response is a 2-step procedure, then at step 406, the gNB 103 provides the OSI to the UE 102, else if the procedure involves more than 2-steps then the gNB 103 provides uplink grant to the UE (102).

At step 407, after acquiring the OSI, the UE 102 applies the relevant configuration parameters according to one or more SCI acquired from the MIB#2. If the OSI includes set of system information parameters and corresponding parameter values associated with SCI other than the SCI broadcasted by the camped cell, then the UE 102 stores the configuration parameters as a configuration list associated with the corresponding SCI. If the network provides system information parameters and corresponding parameter values associated with MIB#2 other than the MIB#2 of the camped cell, then the UE 102 stores the MIB#2 associated with the at least one of: the SCI, the valuetag, the GCI or area identifier.

In an embodiment, a SI part or SI message can be either a one-to-one mapping between SI part/SI message and SI-block or multiple SI-block(s) are bundled as one SI part/SI message; wherein the mapping between SI part/SI message and SI-block is either fixed or configurable.

In an embodiment, if the mapping between SI part/SI message and SI-block is configurable then such configuration information related to mapping is provided in the MSI.

In some embodiments, the scheduling information related to SI-block(s) supported in the cell includes the mapping between SI part/SI message and one or more SI-block(s), periodicity of the SI message, SI message broadcast window and an indicator whether the SI message is provided on demand or periodically broadcasted; wherein the periodicity of the SI message is with reference to start of system modification period.

In some embodiments, the MSI indicates whether an SI (e.g. SIB) is periodically broadcasted or provided on demand or based on the request. In order to obtain the one or more SIBs which are not periodically broadcasted and are provided on demand, the UE initiates the SI request/response procedure described in the FIG. 5.

Figure 5:
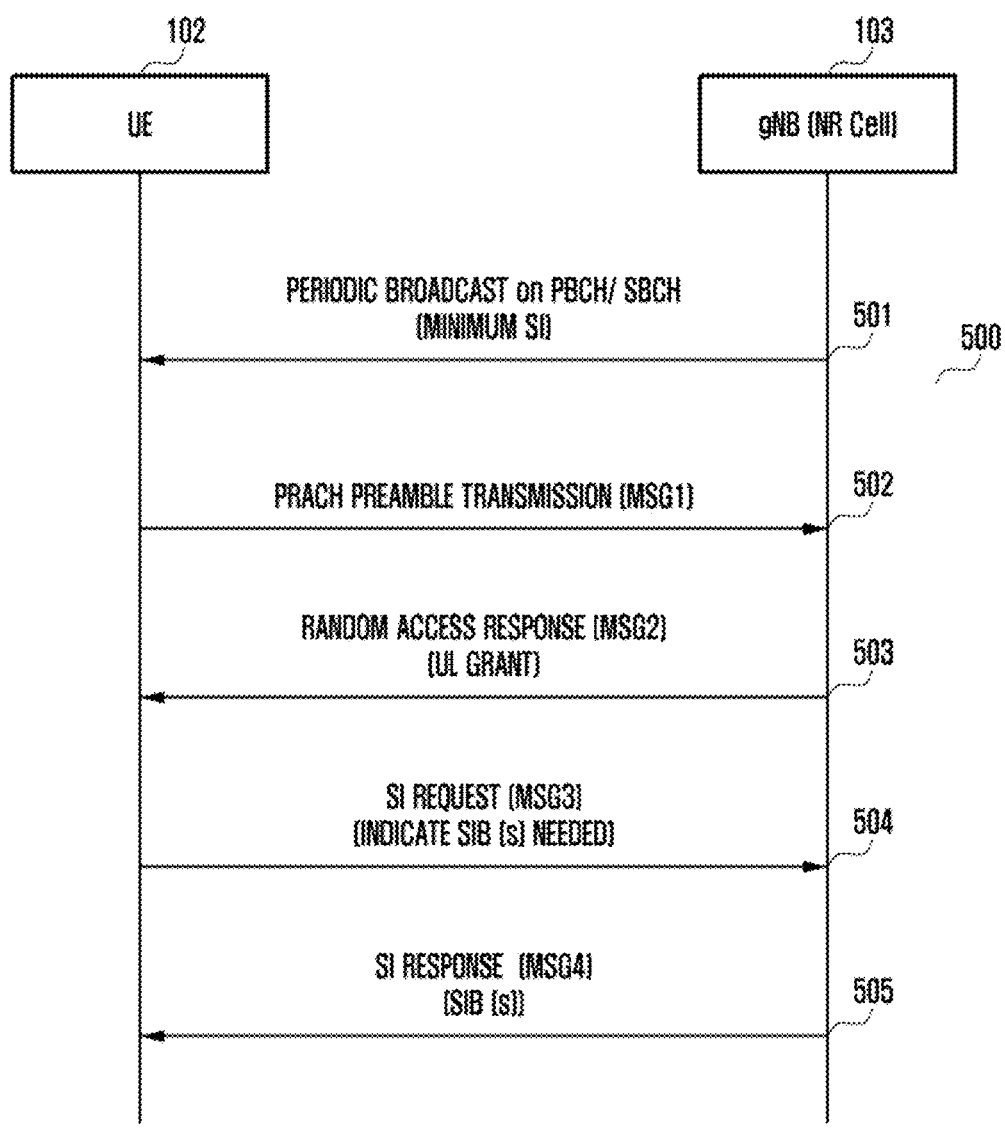
FIG. 5 is a sequence diagram illustrating various signaling messages for system information request response based on random access procedure, according to an embodiment as disclosed herein.

FIG. 5 is a sequence diagram illustrating various signaling messages for system information request response based on random access procedure, according to an embodiment as disclosed herein. The SI request/response procedure is based on the random access procedure.

At step 501, the UE 102 receives the MSI periodically broadcasted by the 5G eNB or the gNB 103. If the UE 102 intends to obtain one or more SIBs which are not periodically broadcasted and are provided based on request from the UE 102, the UE at step 502 transmits PRACH preamble i.e. message1 (MSG1) to the gNB 103. The on demand indicator in the MSI indicates which SIBs are provided upon UE request. The MSI indicates preamble/PRACH resources are not reserved for SI request. The preamble transmitted at step 502, is an unreserved preamble randomly selected by the UE 102.

At step 503, the UE 102 receives random access response (RAR i.e. MSG2) from the gNB 103. In the UL grant received in the random access response corresponding to the PRACH preamble transmitted by the UE 102, the UE 102 sends system information request message i.e. MSG3 at step 504.

It should be noted that all the UEs may not need all the SIBs. Thus, the UE 102 indicates the one or more SIBs as it needs (e.g. by including either associated SCI or SIB type) in the system information request message (MSG3) transmitted at step 504.

The gNB 103 sends the requested SIB(s) in system information response message (MSG4) at step 505. The system information response message can be signaled in broadcast or dedicated manner. The broadcast of requested SIBs occurs in the SI window according scheduling information included in MSI, the other UEs which are interested in same SI need not perform preamble transmission, thereby saving battery power and resources.

Figure 6A:
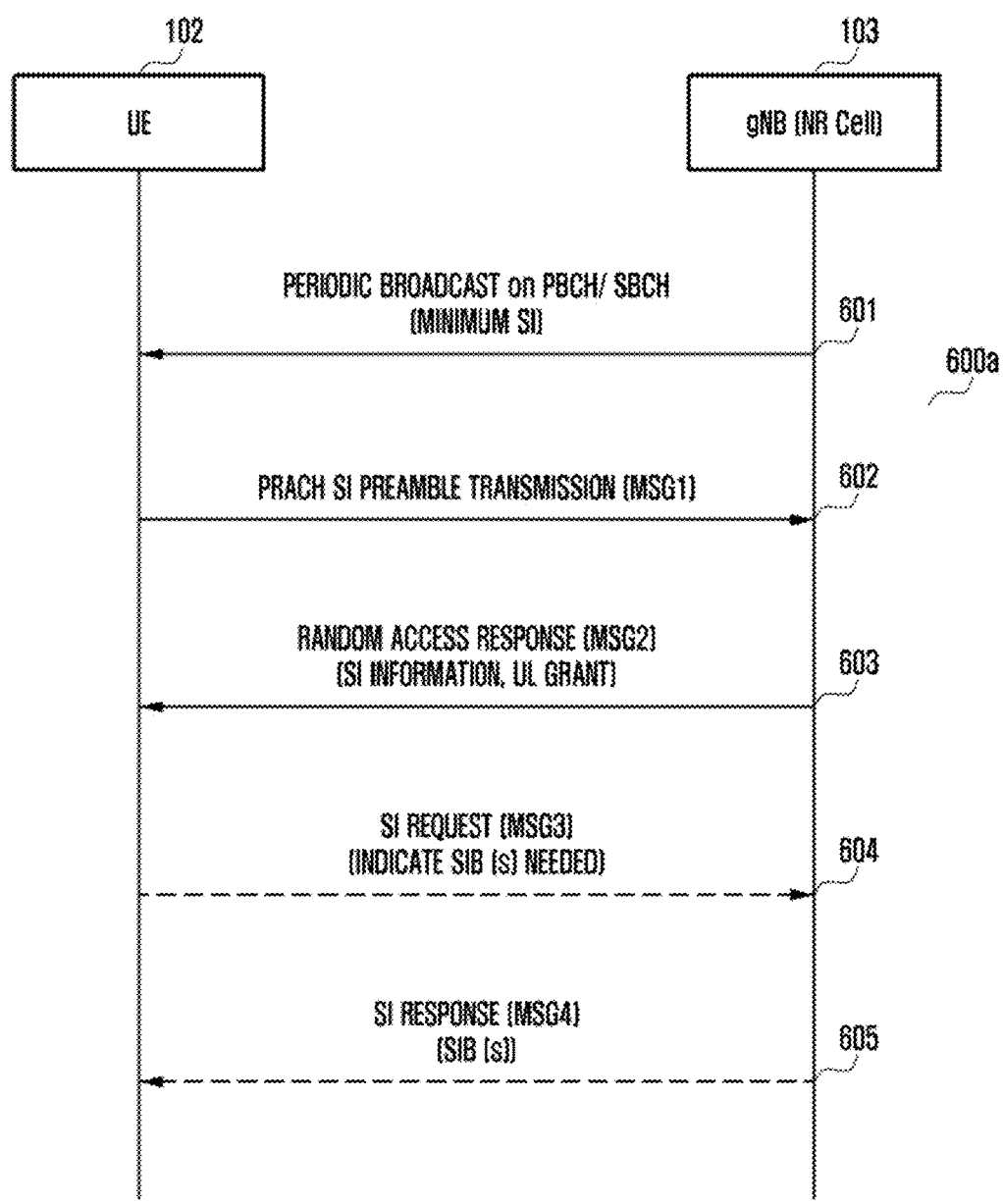
FIGS. 6A and 6B are sequence diagrams illustrating various signaling messages for the system information request response based on the random access procedure, according to an embodiment as disclosed herein.
Figure 6B:
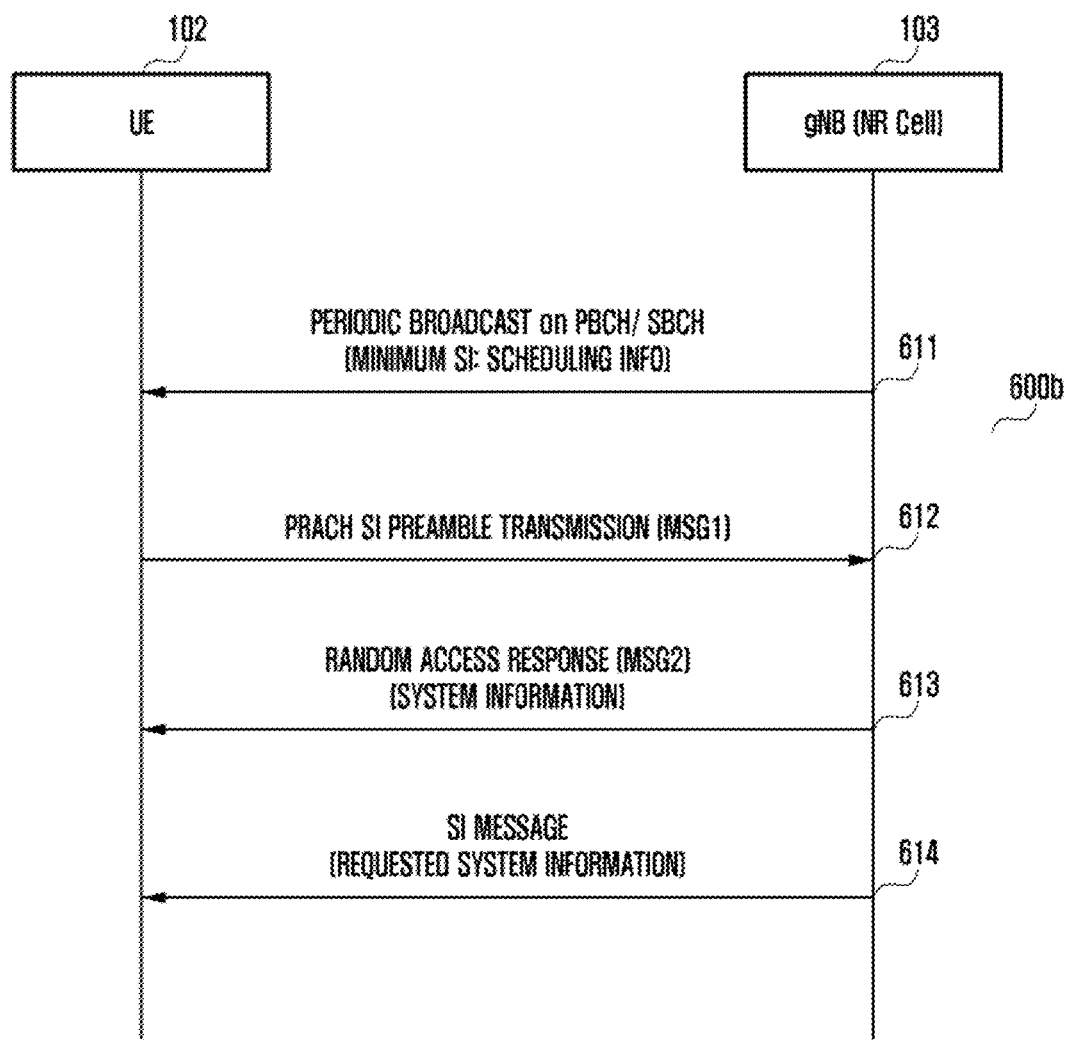

FIGS. 6A and 6B are sequence diagrams illustrating various signaling messages for the system information request response based on the random access procedure, according to an embodiment as disclosed herein.

In some embodiments, the SI request/response procedure can be further enhanced as shown in FIG. 6A. The PRACH preamble or PRACH resource can be reserved for requesting SI. The reservation of PRACH preamble or PRACH resource is indicated in MSI. At step 601, the PRACH preamble(s) or PRACH resource(s) for requesting the SI provided on demand can be indicated in periodically broadcasted MSI. If the UE 102 intends to obtain one or more SIBs which are not periodically broadcasted and are provided based on the request from the UE (i.e., on demand), the UE 102, at step 602, transmits the PRACH SI preamble (MSG1). The UE 102 transmits PRACH preamble reserved for requesting the SI as indicated in the MSI. If the PRACH preamble is not reserved but PRACH resource is reserved then an unreserved preamble randomly selected by the UE is transmitted on the reserved PRACH resource as indicated in the MSI. The reserved PRACH resource is a time-frequency resource reserved for requested SI provided on demand.

At step 603, the gNB 103 sends some SI (e.g. non-service specific information such as inter frequency/RAT cell reselection information which are needed by each UE and are not included in the MSI) in random access response message (MSG2). Such non-service specific information like re-selection parameters is essential SI required by the UE 102 for idle mode mobility. The gNB 103 may also include UL grant in random access response message.

In an embodiment, the preamble used by UE at step 602 can indicate whether UE needs UL grant for sending SI request i.e. MSG3 or not.

In an embodiment, the preamble used by UE at step 602 can indicate whether the UE 102 needs some SI in RAR i.e. MSG2 or not. If the UE 102 needs additional SI, the UE 102 sends system information request message (MSG3) in the UL grant at step 604. The UE 102 indicates the one or more SIBs it needs in system information request message (e.g. by including either associated SCI or SIB type) at step 604. Further, the gNB 103 sends the requested SIB(s) in the system information response message (MSG4) at step 605.

In some embodiments, the SI request/response procedure is an alternative procedure as shown in the FIG. 6B when either the PRACH preamble or PRACH resource is reserved. PRACH preamble or time-frequency PRACH resource can be reserved for requesting SI provided on demand as indicated in MSI. At step 611, the PRACH preamble(s) or time-frequency PRACH resources for requesting the SI provided on demand can be indicated in periodically broadcasted MSI. If the UE 102 intends to obtain one or more SIBs which are not periodically broadcasted and are provided based on request, the UE 102, at step 612, transmits PRACH SI preamble (MSG1). The UE 102 transmits the PRACH preamble reserved for requesting SI as indicated in MSI. If the PRACH preamble is not reserved and the time-frequency PRACH resource is reserved then the preamble is transmitted on the reserved time-frequency PRACH resource, wherein the transmitted preamble is an unreserved preamble randomly selected by the UE. It should be noted that, instead of including the requested system information in random access response message (i.e. MSG2), the requested system information can be transmitted in one or more subframes indicated by scheduling information.

The scheduling information is provided in the MSI for each SIB or set of SIBs irrespective of whether they are periodically broadcasted or on provided based on request from the UE 102. If the scheduling information is not included in the MSI, at step 611, alternately the scheduling information can be included in RAR at step 613 to minimize overhead of minimum SI. Similar to LTE-SI scheduling information the NR-SI scheduling information may indicate the SI-window and SI-periodicity. The PRACH SI preamble transmission, at step 612 acts as a trigger to transmit the requested SIB(s) according to NR-SI scheduling information. The Random access response message (i.e. MSG2) received at step 613 acknowledges that PRACH SI preamble transmission is successful. If the RAR is not received at step 613 UE 102 retransmits the PRACH SI preamble. At step 614, the 5G gNB 103 broadcasts the requested SIBs at step 612, in the respective SI-windows as indicated in the scheduling information included in MSI at step 611.

In the above described embodiments, according to FIG. 5, if a SI is broadcasted based on request from the UE 102, then before initiating system information request, the UE 102 checks the MSI or look for OSI broadcast for a pre-defined time interval. If desired SI is not received during this pre-defined time, then the UE 102 initiates system information request. In the above described procedures, according to FIGS. 6A and 6B, the UE 102 can look for one of: on demand SI indicator and/or scheduling information in RAR for a pre-defined time interval before initiating system information request. Whether a particular SI is broadcasted or not can also be indicated in the periodically broadcasted MSI.

In an embodiment, a SCI or valuetag or GCI or area identifier can be associated with SI-block comprising minimum SI parameters which cannot be included in MIB#1 and some important cell-specific parameters like cell selection parameters and cell access parameters; wherein such a SI-block can be termed as comprising essential system information i.e. MIB#2 or SIB1.

In various embodiments, at least two preambles are reserved for SCI associated with SI-block comprising minimum SI parameters which cannot be included in MIB and some important cell-specific parameters; wherein one preamble indicates transmission of UL grant in random access response (RAR) along with SI parameters and another preamble indicates transmission of only SI parameters in RAR without UL grant.

In an embodiment, the on demand indicator that indicates UE 102 is allowed to request one or more other SI-block(s) from the gNB 103 and the bitmap concerning supported SI-block(s) in the cell is transmitted in the RAR.

In an embodiments, when the UE 102 requests one or more other SI-block(s) on demand from the gNB 103, the scheduling information of the requested SI-block(s); if decided to be broadcasted by the network; can be included in one of the RAR, Message 4 (MSG4), SI Response message or can be already included in minimum SI or essential SI; wherein the scheduling information comprises the mapping between SI part/SI message and one or more SI-block(s), periodicity of the SI message and SI message broadcast window.

Figure 7:
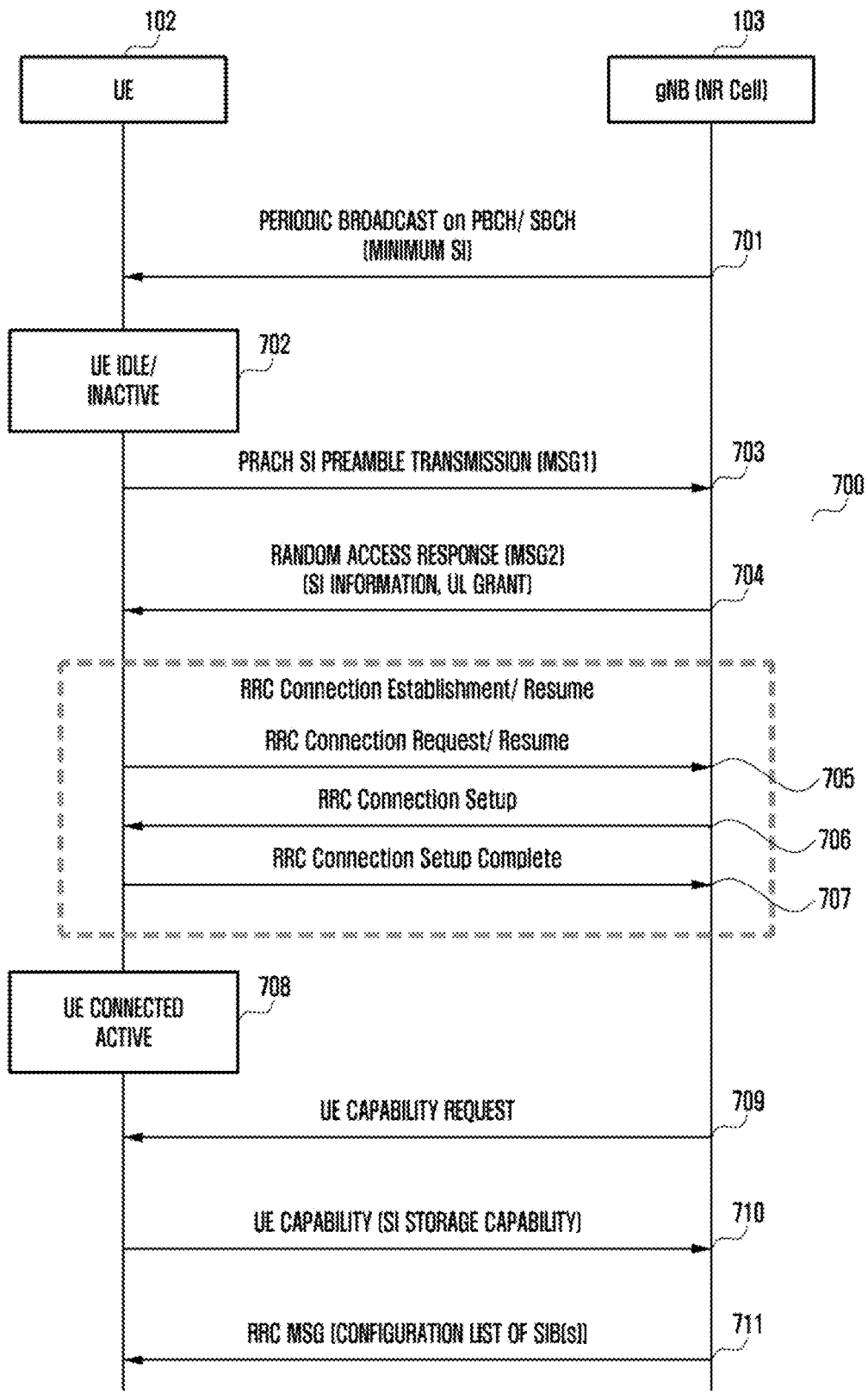
FIG. 7 is a sequence diagram illustrating various signaling messages for provisioning of configuration list corresponding to requested SI-block(s) based on UE storage capability to store multiple configurations, according to an embodiment as disclosed herein.

FIG. 7 is a sequence diagram illustrating various signaling messages for provisioning of configuration list corresponding to requested SI-block(s) based on UE storage capability to store multiple configurations, according to an embodiment as disclosed herein.

In an embodiments, the procedure to obtain one or more SIBs which are not periodically broadcasted and are provided based on the request from the UE (i.e., on demand) is illustrated in FIG. 7.

At step 701, the UE 102 obtains the MSI from the periodic broadcast. If the UE 102 is in idle or inactive state as at step 702, and intents to obtain one or more SIBs which are not periodically broadcasted and are provided on demand, the UE 102 at step 703 transmits PRACH preamble. The UE 102 transmits PRACH preamble (if reserved) or unreserved preamble for requesting the SI. At step 704, the gNB 103 sends the random access response (RAR) message i.e. MSG2 which can either be an acknowledgement for reception of preamble and further includes UL grant for MSG3 transmission and optionally non-service specific information such as inter frequency/RAT cell re-selection info needed by the UE. Further, the UE 102 in Idle/inactive state performs connection setup/resume procedure (as at step 705 to step 707) and enters the connected state. Upon successful connection establishment procedure or successful connection resume procedure the UE enters connected state or active mode at step 708.

At step 709, the gNB 103 may request capability of connected UE associated with SI storage. In response, at step 710, the UE 102 includes its capability related to storage of the system information. This is useful for gNB 103 to determine if multiple SI configurations or multiple versions of the same SI-block can be stored by the UE 102 and accordingly the gNB 103 provides the list of SI configurations at step 711. It is to be noted that gNB 103 may provide the list of SI configuration unsolicited by the UE 102 or may provide the same to the UE 102 based on request from the UE 102.

In an alternate embodiment, after the step 704, the UE may not enter RRC connected state and send the SI request to gNB 103 after step 704. The UE 102 may include its SI storage capability in the request message i.e. MSG3 sent at step 705. Accordingly, the gNB 103 may provide one or more SI configurations for the SI requested by the UE 102.

In some embodiments, the gNB 103 provides the UE 102 with one or more configuration for each SI-block or SI part/SI message wherein each configuration of the SI-block or SI part/SI message is associated with a System configuration index or system configuration identifier (SCI) or a valuetag.

In various embodiments, the UE 102 is provided with a configuration list corresponding to each SI-block or SI part requested by the UE 102 wherein, the transmission of a single configuration or plurality of configuration corresponding to the requested SI-block or SI part is decided by network based on UE's SI storage capability.

In some embodiments, the UE's capability to store plurality of configurations corresponding to SI-block requested is informed to the network (i.e., gNB 103); wherein the capability can be indicated during the request procedure or after the request procedure.

In some embodiments, when the network provides one or more configuration for each SI-block or SI part/SI message, then if the UE 102 which does not have the capability to store multiple configurations corresponding to the SI-block identifies the configuration applicable in the serving cell based on the SCI broadcasted in minimum SI and stores the relevant configuration while discarding other configurations not applicable in the serving cell.

In an embodiment, for UE storage capability management, when the UE detects certain SCI associated with a SI-block or SI part/SI message is rarely broadcasted by the network in minimum SI, then the UE can delete the stored configuration corresponding to the less frequently broadcasted SCI.

In some embodiments, for UE storage capability management, the UE 102 prioritizes the storage of plurality of configurations corresponding to one or more SI-block(s) or SI part/SI message(s) for which the associated SCI change occurs more frequently during mobility from one cell to another compared to plurality of configurations corresponding to one or more SI-block(s) or SI part/SI message(s) for which the associated SCI is rarely detected in broadcast of minimum SI.

In an embodiment, the UE 102 prioritizes the storage of plurality of configurations corresponding to essential-SI block(s) over plurality of configurations corresponding to other SI-block(s).

In an embodiment, the UE 102 prioritizes the storage of plurality of configurations corresponding to SI-block(s) related to the service(s) in which UE is interested and essential SI-block(s).

In an embodiment, for SCI range management, if a certain SCI associated with a SI-block or SI part/SI message is broadcasted by network in minimum SI and the configuration corresponding to the SI-block is already provided to the UE 102, then the same SCI value is not associated with a different configuration for the corresponding SI-block for a pre-determined time period (e.g. 24 hours).

Figure 8:
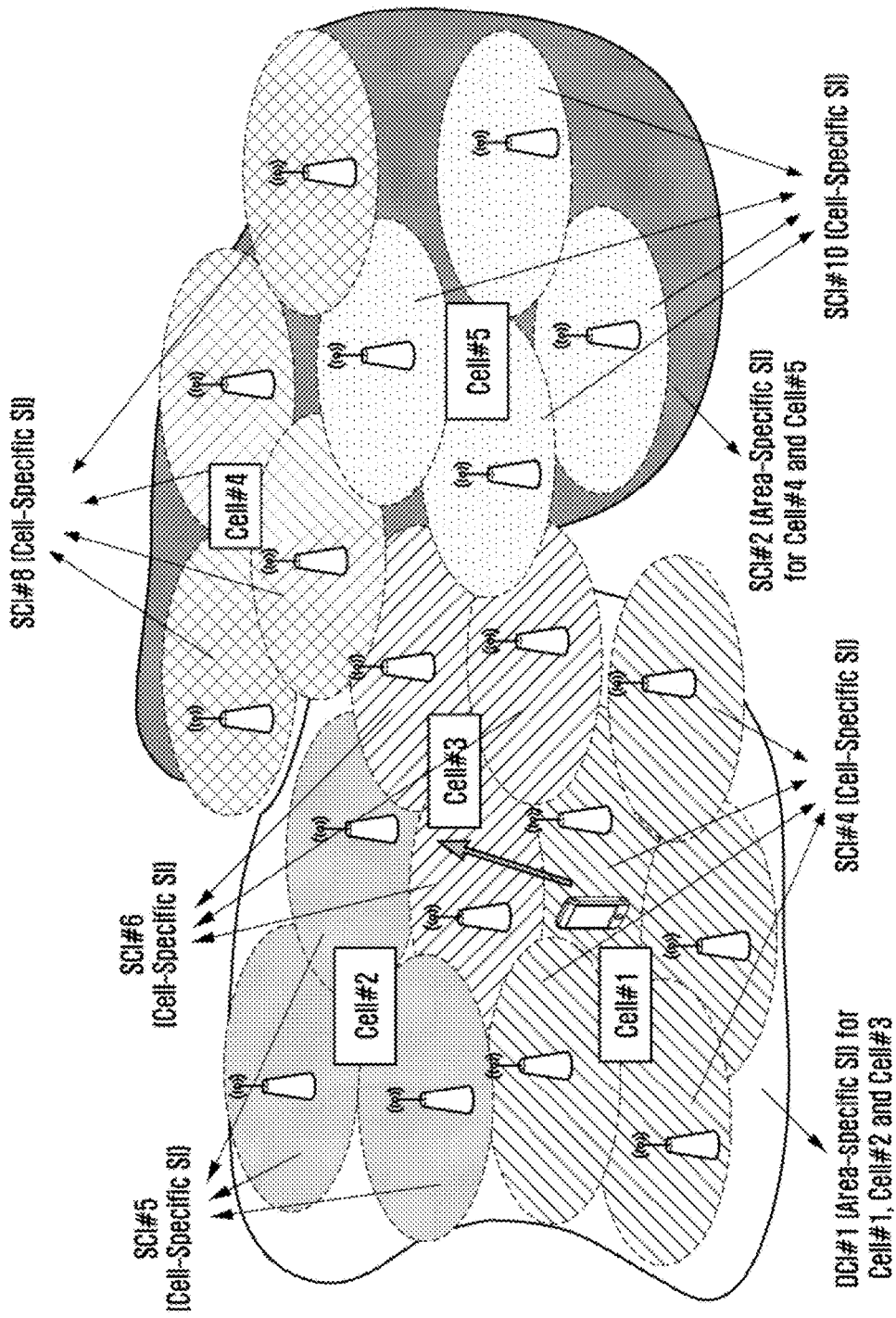
FIG. 8 is an example illustration in which change in system configuration index acquired from MIB during cell re-selection is explained, according to an embodiment as disclosed herein.

FIG. 8 is an example illustration in which change in system configuration index acquired from MSI during cell re-selection is explained, according to an embodiment as disclosed herein. As shown in the FIG. 8 a group of cells i.e. Cell#1, Cell#2 and Cell#3 have the same set of SI for some SI-block/SI message called Common SI or area-specific SI. The Common SI or area-specific SI is associated with SCI#1 (i.e., covering the area of Cell#1, Cell#2 and Cell#3). However, the local cell-specific information or non-service specific information like the cell re-selection parameters applicable to the respective cells is different where the index associated with cell-specific SI-block is different in respective cells e.g., SCI#4 associated with cell-specific SI-block of Cell#1, SCI#5 associated with cell-specific SI-block of Cell#2 and SCI#6 associated with cell-specific SI-block of Cell#3. Similarly the area covering Cell#4 and Cell#5 has a different configuration for the Common SI or area-specific information represented by SCI#2 than the Common SI or area-specific information represented by SCI#1. Likewise, the cell-specific SI applicable to Cell#4 and Cell#5 is different. For example, SCI#8 associated with cell-specific SI-block of Cell#4 and SCI#10 associated with cell-specific SI-block of Cell#5. Consider that the UE 102 is in Cell#1, where the UE 102 detects SCI#4 for cell-specific SI-block or non-service specific SI-block and SCI#1 for SI-block(s)/SI message associated with Common SI or area-specific SI. The UE 102 has acquired the configuration associated with SCI#1 and SCI#4 either through cell broadcast or on demand by requesting from the network. When the UE 102 moves from Cell#1 to Cell#3 then the UE 102 detects in the MSI that SCI#1 associated with Common SI or area-specific SI-block(s) remains same whilst the index associated with cell-specific SI-block has changed from SCI#4 to SCI#6. During the mobility from Cell#1 to Cell#3 when the UE acquires the first MIB from Cell#3 then the UE determines either to acquire second MIB from Cell#3 or bar Cell#3 for a pre-determined period of time based on cell barring indication included in the first MIB. The UE 102 acquires second MIB from Cell#3 if the received cell barring indication in acquired first MIB is disabled. The second MIB includes plurality of SCI, valuetag, GCI, area identifier and essential parameters for camping and cell access. The UE 102 further determines either to camp on Cell#3 or bar Cell#3 for a pre-determined period of time based on the contents of second MIB. If the UE 102 fails to acquire the second MIB from Cell#3 then the UE 102 considers Cell#3 barred for a pre-determined period time. If the UE 102 is successful in acquiring the second MIB transmitted on the SBCH by Cell#3 then the checks if full contents of second MIB are received. If the UE 102 receives the cell selection parameters in the acquired second MIB then Cell#3 is considered candidate for camping. If UE 102 does not receive full contents of second MIB then based on at least one of received SCI, valuetag, GCI or area-identifier in the acquired second MIB the UE 102 checks if it has valid stored essential parameters associated with at least one of: the acquired SCI, valuetag, GCI or area-identifier. If valid stored essential parameters exists for the acquired SCI or acquired valuetag or acquired GCI or acquired area identifier then Cell#3 is considered candidate for camping. The UE may have received the second MIB from some other cell eg. Cell#1 or from some other frequency and stored the second MIB, wherein the stored second MIB corresponds with at least one SCI, valuetag, GCI or area identifier received in the second MIB acquired from Cell#3. If the UE 102 does not receive essential parameters in second MIB from Cell#3 and does not have valid stored essential parameters associated with second MIB of Cell#3 then the UE 102 considers the Cell#3 as barred for a pre-determined period of time. If the UE 102 already has stored configuration associated with SCI#6, then the UE 102 applies that configuration in Cell#3 while the configuration corresponding to Common SI or area-specific SI-block(s) remains same. Otherwise, if the UE 102 does not have stored configuration associated with SCI#6 then either it acquires it from cell broadcast or requests it from the network. Therefore, while moving from Cell#1 to Cell#3 there is no need to re-acquire the Common SI or area-specific SI-block(s) and the need to re-acquire cell-specific SI depends on stored configurations.

Such approach to avoid frequent re-acquiring or request of SI due to UE's mobility is desirable for battery power savings of the UE 102. In a typical deployment, different configurations of each SI-block/SI message (mostly cell-specific SI or non-service specific SI-block(s)) may be used in different parts of network. The list of these configurations applicable in different parts of the network of the same PLMN can be provided to the UE 102, upon request. Each configuration in the configuration list of a SI-block/SI message is identified by the index/SCI of that configuration in the configuration list. The UE 102 stores the list of configurations. The index/SCI of configuration associated with each SI-block/SI message used in the cell is broadcasted in the MSI. When the UE 102 performs cell re-selection and the UE 102 has the configuration corresponding to index/SCI of a SI-block/SI message broadcasted in that cell, UE do not need to re-acquire or request that SI-block. The UE 102 re-acquires or requests for a SI-block/SI message only, when it does not have the configuration corresponding to the index/SCI of that SI-block broadcasted in the cell.

Addition of a new SI-block in future release would result in SCI to be defined for the newly added SI-block. This does not have any impact to legacy UEs because they will simply ignore the new SCI associated with new SI-block. Newly defined SCI need to be broadcasted in minimum SI resulting in size increase. However newly defined SCI can be included in essential SI-block i.e. MIB#2 instead of MIB#1.

Addition of new SI-block in a future release to a SI part/SI message which was defined in previous release including old SI-block(s). e.g. SI message#1: {SIB#3, SIB#4} in old release and in new release SI message#1: {SIB#3, SIB#4, SIB#10} wherein SIB#10 is added to SI message#1 because SIB#10 has similar functionality like SIB#3 and SIB#4. This does not result in new SCI and hence minimum SI size is not increased. This may not have impact to legacy UEs provided legacy UEs discard old stored configuration associated with SI message#1 and apply new configuration for SI message#1 ignoring the configuration of SIB#10. However if SCI associated with SI message#1 changes due to configuration change of SIB#10 then legacy UEs unnecessarily have to acquire new configuration where configuration of SIB#3 and SIB#4 has not changed compared to stored configuration.

Addition of new parameters to existing SI-block in future release may not result in newly defined SCI. e.g., SIB#3: {parameter a, parameter b} in old release and in new release SIB#3: {parameter a, parameter b, parameter c, parameter d} wherein newly added parameter c and parameter d to SIB#3 enhance the functionality for new UEs. This does not result in new SCI and hence minimum SI size is not increased. This may not have impact to legacy UEs provided legacy UEs discard old stored configuration associated with SIB#3 and apply new configuration for SIB#3 ignoring the newly added parameters c and d. However if SCI associated with SIB#3 changes due to parameter value change of parameters c and d then legacy UEs unnecessarily have to acquire new configuration of SIB#3 where parameter values of a and b has not changed compared to stored configuration.

Addition of new parameter values to existing parameter in future release may not result in newly defined SCI. For example, parameter a: {value a1, value a2} in old release and in new release parameter a: {value a1, value a2, value a3, value a4}, wherein newly added values a3 and a4 added to parameter a; extends the functionality for new UEs. This does not result in new SCI and hence minimum SI size is not increased. This may not have impact to legacy UEs provided new parameter values are added as adding new parameter while retaining old parameter. Legacy UEs discard new parameter 'a' and apply old parameter 'a' while new UEs discard old parameter 'a' and apply new parameter 'a'. However, if SCI changes due to newly added parameter values then legacy UEs unnecessarily have to acquire new configuration of old parameter 'a' and new parameter 'a' where old parameter values of 'a' has not changed. Similarly a new parameter may also be added in new release resulting in a new configuration identified by a new SCI value. So legacy UEs unnecessarily have to acquire new configuration. Therefore, a mechanism is required for extension of SI-block(s) or SI-messages in future releases where upon extending the SI with new information elements or parameters or new parameter values do not have impact on legacy UE operation. Various methods for extension are described below:

In an embodiment list of configurations of system information (e.g. SIB) can be provided to UE. The list may include configurations of various releases irrespective of release supported by UE. This can avoid requests but UE has to store more information. Consider that, for a system information (e.g. SIB X), Release X of NR has three parameters A, B, C; Release X+1 of NR has four parameters A, B, C, D; Release X+2 of NR has five parameters A, B, C, D, E. Network supports all these releases. Let's say cell#1 broadcast index 1, cell#2 broadcast index 2 and cell#3 broadcast index 3. The configuration corresponding to these indexes are as follows: Config 1: {A1, B1, C1} associated with index 1/SCI#1; Config 2: {A1, B1, C1, D1} associated with index 2/SCI#2 and Config 3: {A1, B1, C1, D1, E1} associated with index 3/SCI#3. When UE requests for system information, say SIBX in cell#1 it is provided with all the three configurations. So when UE moves to cell#2 or cell#3 there is no need to request again.

In some embodiments, system information configuration identified by an SCI, includes one or more list of SCIs of the system information configurations which includes the parameters/values in this configuration wherein list is specific to a release. Consider that, for a system information (e.g. SIB X), Release X of NR has three parameters A, B, C; Release X+1 of NR has four parameters A, B, C, D; Release X+2 of NR has five parameters A, B, C, D, E. Network supports all these releases. The configuration corresponding to these indexes are as follows: Config 1: {A1, B1, C1} associated with index 1/SCI#1; Config 2: {A1, B1, C1, D1} associated with index 2/SCI#2 and Config 3: {A1, B1, C1, D1, E1} associated with index 3/SCI#3.

The list of SCIs included for various configurations in this example is shown below: In this case the configuration includes list of SCIs of all (including this configuration) configurations of each release which includes this configuration.

Config 1: {A1, B1, C1}→Index 1
Release X: index 1, 2, 3
Release X+1: index 1
Release X+2: index 1
Config 2: {A1, B1, C1, D1}→Index 2
Release X: index 1, 2, 3
Release X+1: index 2, 3
Release X+2: index 2
Config 3: {A1, B1, C1, D1, E1}→Index 3
Release X: index 1, 2, 3
Release X+1: index 2, 3
Release X+2: index 3

In this case configuration 1 includes a list of SCIs for release X which contains index 1/SCI#1, index 2/SCI#2 and index 3/SCI#3. This means that for release X UE this configuration which is identified by index 1/SCI#1 is also included in configuration with index 2/SCI#2 and index 3/SCI#3. In other words index 1/SCI#1, index 2/SCI#2 and index 3/SCI#3 are equivalent. Release X UE can use this configuration irrespective of whether cell is broadcasting index 1 or index 2 or index 3. Configuration 1 also includes a list of SCIs for release X+1 which contains only index 1/SCI#1. Configuration 1 also includes a list of SCIs for release X+2 which contains only index 1/SCI#1.

Alternately, the list of SCIs included for various configurations in this example is shown below: The list only includes indexes of other configurations which has same configuration. If list of SCIs for a particular release is not present then it means this configuration is not present in another configuration.

Config 1: {A1, B1, C1}→Index 1
Release X: index 2, 3
Config 2: {A1, B1, C1, D1}→Index 2
Release X: index 1, 3
Release X+1: index 3
Config 3: {A1, B1, C1, D1, E1}→Index 3
Release X: index 1, 2
Release X+1: index 2

Consider that cell#1 broadcast index 1, cell#2 broadcast index 2 and cell#3 broadcast index 3. The UE 102 obtains configuration 1 in cell#1. When the UE 102 with release X moves to cell#2, it does not have to request as it knows index 1 and 2 have same value for release X. When UE with release X+1 or X+2 moves to cell#2, it requests as for index 1 and index 2 does not have same configuration for release X+1 and X+2.

In some embodiments, in addition to broadcasting the configuration index used in the cell, cell also broadcasts the list of indexes which has same configuration as this index for a particular release. Consider that, for a system information (e.g. SIB X), Release X of NR has three parameters A, B, C; Release X+1 of NR has four parameters A, B, C, D; Release X+2 of NR has five parameters A, B, C, D, E. Network supports all these releases. The configuration corresponding to these indexes are as follows: Config 1: {A1, B1, C1} associated with index 1/SCI#1; Config 2: {A1, B1, C1, D1} associated with index 2/SCI#2 and Config 3: {A1, B1, C1, D1, E1} associated with index 3/SCI#3. Let's say cell#1 is release X and uses Config 1, cell#2 is release X+1 and uses Config 2 and cell#3 is release X+2 and uses Config 3. The indexes broadcasted by these cells are as follows:

Config 1: {A1, B1, C1}→Index 1
Cell using this configuration broadcast index 1
Config 2: {A1, B1, C1, D1}→Index 2
Cell using this configuration broadcast index 2. It also broadcast that for Release X UE index 1 and 2 are same.
Config 3: {A1, B1, C1, D1, E1}→Index 3
Cell using this configuration broadcast index 3. It also broadcast that for Release X UE index 1, 2 and 3 are same. It also broadcast that for Release X+1 UE index 2 and 3 are same.

The UE 102 obtains configuration 1 in cell#1 of Release X it sees only index 1. When the UE 102 of release X moves to cell#2 of Release X+1, it see list of indexes from Cell#2 (i.e. index 1 and index 2) meant for UE of release X. For release X, the UE 102 does not have to request as index 1 and 2 have same meaning. Further, when the UE 102 moves to Cell#3 it see list of indexes from Cell#3 (i.e. index 1, index 2 and index 3) meant for UE of release X. For release X, the UE 102 does not have to request as index 1, 2 and 3 have same meaning and UE already has configuration associated with index 1.

A UE of release X+1 in cell#1 of release X will behave like a legacy UE of release X. When UE of release X+1 move to cell#2 from Cell#1 it just had configuration 1 from Cell#1 and it does not find any list of indexes from Cell#2 meant for UEs of release X+1 (i.e. only index 2). Since UE of release X+2 does not see a list of indexes meant for it then UE of release X+1 request the configuration for index 2. Same operation is performed by UE of release X+2.

In some embodiments, if a configuration is same for several indexes then list of indexes for which this configuration is same can be provided. If the UE 102 moves from one cell to another cell broadcasting different index, it does not request if the configuration used in the old cell has all parameters according to release supported by the UE 102 and index broadcasted in new cell is included in the index list of configuration used in old cell. Consider that, for a system information (e.g. SIB X), Release X of 5G system, has three parameters A, B, C; Release X+1 of 5G has four parameters A, B, C, D; Release X+2 of 5G has five parameters A, B, C, D, E. Network supports all these releases. The configuration corresponding to these indexes are as follows: Config 1: {A1, B1, C1} associated with index 1/SCI#1; Config 2: {A1, B1, C1, D1} associated with index 2/SCI#2 and Config 3: {A1, B1, C1, D1, E1} associated with index 3/SCI#3. The index list for each of these configuration is as follows:

Config 1: {A1, B1, C1}→Index list: 1, 2, 3 (Index of configurations which includes these parameters/values)
Config 2: {A1, B1, C1, D1}→Index list: 2, 3
Config 3: {A1, B1, C1, D1, E1}→Index List: 3

The UE 102 is in cell#1 and has configuration 1. The UE 102 moves to cell#2. If UE is of release X, it does not request as it knows that parameters it needs are same for index 1 and index 2. If the UE 102 is release X+1, it knows that for SIBX there are four parameters as per specification and Config 1 has only three parameters, so when it goes to cell 2 broadcasting index 2 it requests. Similarly UE of release X+2, it knows that for SIBX there are five parameters as per specification and Config 1 has only three parameters, so when it goes to cell#2 it requests.

Further, if the UE 102 moves to cell#3 from cell#2. If the UE 102 is of release X, the UE 102 does not request as the UE 102 knows that parameters it needs are same for index 1, index 2 and index 3. If the UE 102 is of release X+1, it knows that parameters it needs are same for index 2 and index 3 and the UE 102 has obtained configuration 2 when it has moved to cell#2. If the UE 102 is of release X+2, it knows that for SIBX there are five parameters as per specification and Config 2 has only four parameters, Config 1 has only three parameters, so when it goes to cell#3 it requests. It should be noted that, if release X UE first enters cell#2 and requests SI, configuration 1 can be provided based on release of UE. UE can include its release info in SI request.

In some embodiments, in a configuration index of configurations which includes parameters/values of this configuration and/or index of configurations whose parameters/values are fully included in this configuration are provided. The highest release for which this configuration is valid is also included in configuration. Consider that for a system information (e.g. SIB X), Release X of NR has three parameters A, B, C; Release X+1 of NR has four parameters A, B, C, D; Release X+2 of NR has five parameters A, B, C, D, E. Network supports all these releases. The configuration corresponding to these indexes are as follows: Config 1: {A1, B1, C1} associated with index 1/SCI#1; Config 2: {A1, B1, C1, D1} associated with index 2/SCI#2, Config 3: {A1, B1, C1, D1, E1} associated with index 3/SCI#3, and Config 4: {A1, B1, C1, D2, E2} associated with index 4/SCI#4. The index list for each of these configuration is as follows:

Config 1: {A1, B1, C1}→Index list: 1, 2, 3, 4; Highest Release: X
Config 2: {A1, B1, C1, D1}→Index list: 1, 2, 3; Highest Release: X+1
Config 3: {A1, B1, C1, D1, E1}→Index List: 1, 2, 3: Highest Release: X+2
Config 4: {A1, B1, C2, D2, E2}→Index List: 1, 4: Release: X+2

In this embodiment, when UE moves from Cell#A to Cell#B, and if index is changed from index P to Index Q, then UE does not request if: Index Q is included in index list of a configuration whose release is greater than or equal to MIN (UE release, Cell release). The UE extract parameters from configuration according to release=MIN (UE release, Cell release).

Figure 9A:
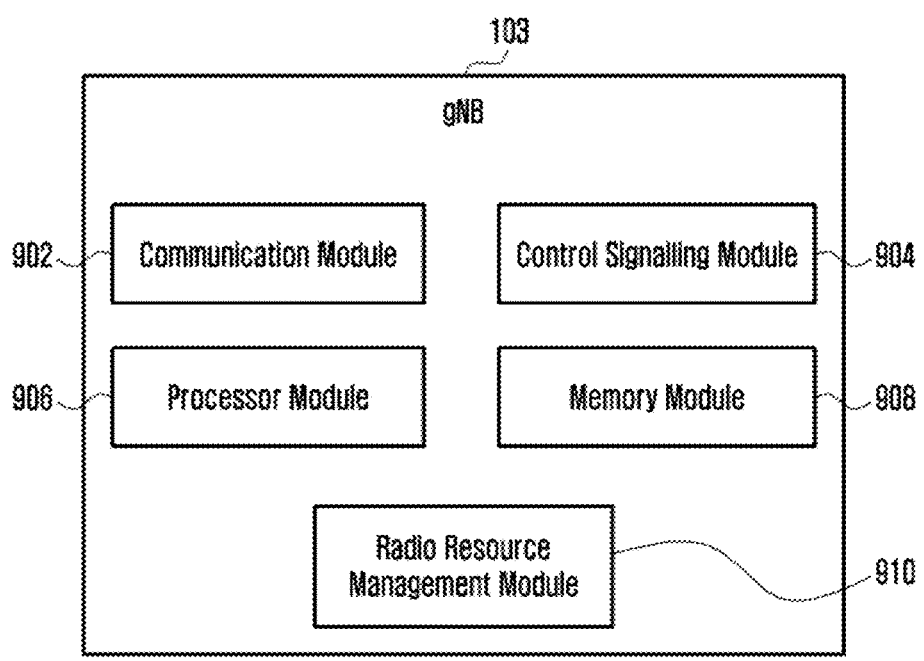
FIG. 9A is a block diagram illustrating various modules of a 5G eNB, according to an embodiment as disclosed herein.

FIG. 9A is a block diagram illustrating various modules of a 5G eNB 103, according to an embodiment as disclosed herein. The primary blocks present in the 5G eNB 103 for communication with the UE 102 include a communication module 902, a control signaling module 904, a processor module 906, a memory module 908 and a radio resource management module 910. In an embodiment of, the communication module 902 is configured to broadcast synchronization signal, PBCH and SBCH to plurality of UEs. In another embodiment, the communication module 902 is configured to receive and detect system information request from plurality of UEs. In yet another embodiment of, the communication module 902 is configured to transmit system information response message to plurality of UEs. In an embodiment of the present disclosure, the communication module 902 is configured to communicate RRC signaling to and from the UE 102. For example, the wireless communication module 902 in a 5G eNB 103 can be configured to communicate the system information table (SIT) to one or more UEs 102a, 102b, 102c. Further, the communication module 902 in the 5G eNB 103 can be configured to transmit and receive data from one or more UEs 102a, 102b, 102c according to physical layer waveform and coding for next generation wireless system. The control signaling module 904 in 5G eNB 103 can be configured to prepare the related RRC messages to be transmitted to the UE 102 and also can be configured to parse the related RRC message received from the UE.

Further, the control signaling module 904 in the 5G eNB 103 can be configured to determine the bearer to be transmitted over within respective cells in the eNB's. The bearer described herein can either be a Data Radio Bearer (DRB) or a Signaling Radio Bearer (SRB). The selection of a bearer is based on several variables, which include for example, but are not limited to, Quality of Service requirements (QoS), traffic characteristics of the bearer, and load and coverage area of the serving cell of eNB. The processor module 906 depicts a computing environment implementing the method for provisioning MSI for the UE in the next generation wireless system 100, according to the embodiments as disclosed herein. The computing environment of 906 comprises at least one processing unit that is equipped with a control unit and an Arithmetic Logic Unit (ALU), a clock chip, plurality of networking devices, and a plurality Input output (I/O) devices. The processor module 1506 is responsible for processing the instructions of the algorithm. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the algorithm. The algorithm comprising of instructions and codes required for the implementation are stored in either the memory module 908 or the storage or both. At the time of execution, the instructions may be fetched from the corresponding memory module 908 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements. The methods shown in the FIG. 4A and FIG. 4B include various units, blocks, modules, or steps described in relation with methods, processes, algorithms, or systems of the present disclosure, which can be implemented using any general purpose processor and any combination of programming language, application, and embedded processor. Further, the memory module 908 is also configured to store information related to operation of the 5G eNB103 and the UE 102. The memory module 908 can be configured to store various UE related configurations when UE is in connected mode and UE capabilities for one or more UEs 102a, 102b, 102c and so on. The radio resource management module 910 is responsible for various aspects like beam level mobility and cell level mobility etc. The radio resource management module 910 in the 5G eNB 103 may be configured to evaluate the handover decisions based on the BRS measurement reports sent by one or more UEs. The 5G eNB 103 receives the measurement reports from one or more UEs 102a, 102b, 102c etc and decide to perform handover for that particular UE. Similarly, radio resource management module 910 in the 5G eNB 103 can be configured to receive the CSI-RS RSRP measurements for handling the measurement set and candidate set for beam level mobility handling for one or more UEs 102a, 102b, 102c etc.

Figure 9B:
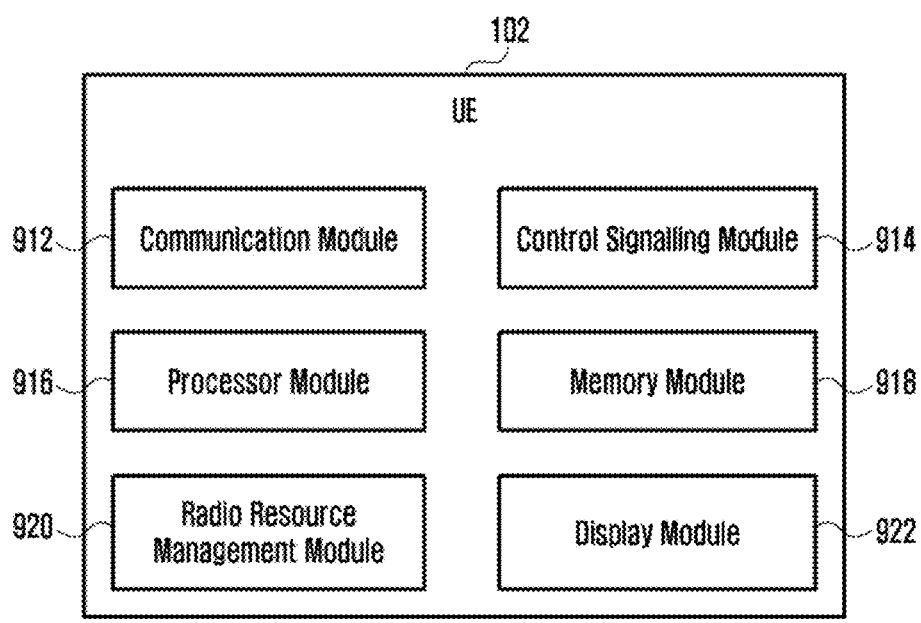
FIG. 9B is a block diagram illustrating various modules of the UE, according to an embodiment as disclosed herein.

FIG. 9B is a block diagram illustrating various modules of the UE 102 according to an embodiment as disclosed herein. The primary blocks present for communication include a communication module 912, a control signaling module 914, a processor module 916, a memory module 918, a radio resource management module 920 and a display module 922. In an embodiment, the communication module 912 is configured to decode the synchronization signal, the beam index sequence, PBCH and SBCH broadcasted by 5G eNB. In another embodiment, the communication module 912 is configured to transmit the request for acquiring SIT on the resource configured by the eNB 103. In yet another embodiment, the communication module 912 is configured to receive system information response message transmitted by the 5G eNB. In an embodiment, the communication module 912 is configured to communicate RRC signaling to and from the 5G eNB 103. For example, the wireless communication module 912 in the UE 102 can be configured to communicate to request for SIT update, measurement report and RRC reconfiguration complete message to the 5G eNB 103. Further, the communication module 912 in the UE 102 can perform random access procedure on the cell of the next generation RAT served by the 5G eNB 103. Further, the communication module 912 in the UE 102 can be configured to transmit and receive data from the 5G eNB 103 according to physical layer waveform and coding assumed for next generation wireless system. The control signaling module 914 in the UE 102 can be configured to prepare the related RRC messages to be transmitted to the 5G eNB 103 and also can be configured to parse the related RRC message received from the 5G eNB 103. The processor module 916 depicts a computing environment in the UE 102 for implementing a method for provisioning MSI for the UE in the next generation wireless system 100, according to the embodiments as disclosed herein. The computing environment of 916 comprises at least one processing unit that is equipped with a control unit and an Arithmetic Logic Unit (ALU), a clock chip, plurality of networking devices, and a plurality Input output (I/O) devices. The processor module 916 is responsible for processing the instructions of the algorithm. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the algorithm. The algorithm comprising of instructions and codes required for the implementation are stored in either the memory module 918 or the storage or both. At the time of execution, the instructions may be fetched from the corresponding memory module 918 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements. The methods shown in the FIGS. 6A, 6B, 6C and the FIG. 7 include various units, blocks, modules, or steps described in relation with methods, processes, algorithms, or systems of the present disclosure, which can be implemented using any general purpose processor and any combination of programming language, application, and embedded processor. Further, the memory module 918 is also configured to store information related to UE operation. The memory module 918 can be configured to store various configurations like minimum system configuration received in MIB, system information table (SIT) received in response message or acquired from broadcast, measurement configuration, etc received from the 5G eNB 103. The radio resource management module 920 in the UE 102 is responsible for various aspects like cell level mobility and beam level mobility etc. The radio resource management module 920 in the UE 102 may be configured to evaluate the cell selection/re-selection handover events based on the BRS measurements and perform CSI-RS RSRP measurements respectively. The display module 922 in the UE 102 can be configured so that user can input information or information can output on the display for the user to understand some UE operations when the UE is operating in dual connectivity mode of operation. Most of the UE operations are transparent to the user and may not need user input nor output on the display.

When the embodiments are implemented by software, firmware, middleware, or a microcode, a program code, or code segments, they can be stored in a machine-readable medium, such as a storage component. The code segment may indicate a procedure, a function, a sub program, a program, a routine, a sub routine, a module, a software package, a class, or a random combination of commands, data structures, or program description sentences. The code segment may be coupled with another code segment or a hardware circuit by transmitting and/or receiving information, data, factors, parameters, or memory contents. The information, factors, parameters, and data may be transmitted using an arbitrary proper means including memory sharing, message transmission, token transmission, and network transmission.

In order to realize the software, the technologies described herein may be implemented as modules (for example, processes, functions and the like) performing the functions described herein. Software codes may be stored in memory units and executed by processors. The memory units may be implemented inside or outside the processor. In this case, the memory units can be access the processor to be communicable through various means known in the art. Although the present disclosure has been described with an exemplary embodiment, various changes and modifications may be suggested to one skilled in the art.

What is claimed is:

1. A method of receiving system information by a terminal in a wireless communication system, the method comprising:

receiving, from a base station in the wireless communication system, a master information block (MIB) that includes first information indicating whether a cell is barred;

receiving, from the base station, a system information block 1 (SIB1) based on the MIB, in case that the first information indicates that the cell is not barred; and transmitting, to the base station, a preamble of a random access procedure that is based on second information on a resource to request at least one system information block (SIB) of other system information (SI), in case that the SIB1 includes the second information on the resource for requesting the other SI.

2. The method of claim 1, further comprising:

receiving, from the base station, an acknowledgement of a request for the at least one SIB included in the preamble; and receiving, from the base station, the at least one SIB in an SI window configured by the SIB1.

3. The method of claim 2, wherein the acknowledgement is included in a MSG2 of the random access procedure.

4. The method of claim 1, wherein the SIB1 further includes third information on the preamble for requesting the other SI, and wherein the preamble is generated based on the third information.

5. The method of claim 4, wherein the preamble is transmitted on a time-frequency resource identified by the second information.

6. The method of claim 1, wherein the SIB1 further includes third information on a valuetag corresponding to an SIB of the other SI.

7. The method of claim 1, wherein the other SI comprises at least one SIB set to not broadcasting.

8. A method of transmitting system information by a base station in a wireless communication system, the method comprising:

transmitting, to a terminal in the wireless communication system, a master information block (MIB) that includes first information indicating whether a cell is barred;

transmitting, to the terminal, a system information block 1 (SIB1) based on the MIB, wherein the SIB1 is received by the terminal in case that the first information indicates that the cell is not barred; and receiving, from the terminal, a preamble of a random access procedure that is based on second information on a resource, the preamble transmitted by the terminal being to request at least one system information block (SIB) of other system information (SI) in case that the SIB1 includes second information on the resource for requesting the other SI.

9. The method of claim 8, further comprising:

transmitting, to the terminal, an acknowledgement of a request for the at least one SIB included in the preamble; and transmitting, to the terminal, the at least one SIB in an SI window configured by the SIB1.

10. The method of claim 9, wherein the acknowledgement is included in a MSG2 of the random access procedure.

11. The method of claim 8, wherein the SIB1 further includes third information on the random access preamble for requesting the other SI, and wherein the preamble is generated based on the third information.

12. The method of claim 11, wherein the preamble is received on a time-frequency resource identified by the second information.

13. The method of claim 8, wherein the SIB1 further includes third information on a valuetag corresponding to an SIB of the other SI.

14. The method of claim 8, wherein the other SI comprises at least one SIB set to not broadcasting.

15. A terminal of receiving system information in a wireless communication system, the terminal comprising:

a transceiver configured to transmit and receive a signal; and a controller configured to:

receive, from a base station in the wireless communication system, a master information block (MIB) that includes first information indicating whether a cell is barred, receive, from the base station, a system information block 1 (SIB1) based on the MIB, in case that the first information indicates that the cell is not barred, and transmit, to the base station, a preamble of a random access procedure that is based on second information on a resource to request at least one system information block (SIB) of other system information (SI), in case that the SIB1 includes the second information on the resource for requesting the other SI.

16. The terminal of claim 15, wherein the controller is further configured to:

receive, from the base station, an acknowledgement of a request for the at least one SIB included in the preamble, and receive, from the base station, the at least one SIB in an SI window configured by the SIB1.

17. The terminal of claim 16, wherein the acknowledgement is included in a MSG2 of the random access procedure.

18. The terminal of claim 15, wherein the SIB1 further includes third information on the random access preamble for requesting the other SI, and wherein the preamble is generated based on the third information.

19. The terminal of claim 18, wherein the preamble is transmitted on a time-frequency resource identified by the second information.

20. The terminal of claim 15, wherein the SIB1 further includes third information on a valuetag corresponding to an SIB of the other SI.

21. The terminal of claim 15, wherein the other SI comprises at least one SIB set to not broadcasting.

22. A base station of transmitting system information in a wireless communication system, the base station comprising:

a transceiver configured to transmit and receive a signal; and a controller configured to:

transmit, to a terminal in the wireless communication system, a master information block (MIB) that includes first information indicating whether a cell is barred, transmit, to the terminal, a system information block 1 (SIB1) based on the MIB, wherein the SIB1 is received by the terminal in case that the first information indicates that the cell is not barred, and receive, from the terminal, a preamble of a random access procedure that is based on second information on a resource, the preamble transmitted by the terminal being to request at least one system information block (SIB) of other system information (SI) in case that the SIB1 includes second information on the resource for requesting the other SI.

23. The base station of claim 22, wherein the controller is further configured to:
transmit, to the terminal, an acknowledgement of a request for the at least one SIB included in the preamble, and
transmit, to the terminal, the at least one SIB in a system information (SI) window configured by the SIB1.

24. The base station of claim 23, wherein the acknowledgement is included in a MSG2 of the random access procedure.

25. The base station of claim 22,
wherein the SIB1 further includes third information on the random access preamble for requesting the other SI, and
wherein the preamble is generated based on the third information.

26. The base station of claim 25, wherein the preamble is received on a time-frequency resource identified by the second information.

27. The base station of claim 22, wherein the SIB1 further includes third information on a valuetag corresponding to an SIB of the other SI.

28. The base station of claim 22, wherein the other SI comprises at least one SIB set to not broadcasting.

* * * * *